(12) United States Patent
Wakabayashi et al.

(10) Patent No.: US 8,459,799 B2
(45) Date of Patent: Jun. 11, 2013

(54) OPTICAL SCANNING PROJECTOR WITH RASTER SCANNING UNIT AND VECTOR SCANNING UNIT

(75) Inventors: Shuich Wakabayashi, Okaya (JP); Akihiro Murata, Hokuto (JP); Yasushi Mizoguchi, Suwa (JP); Takeshi Shimizu, Chino (JP)

(73) Assignee: Seiko Epson Corporation (JP)

( * ) Notice: Subject to any disclaimer, the term of this patent is extended or adjusted under 35 U.S.C. 154(b) by 324 days.

(21) Appl. No.: 12/906,191

(22) Filed: Oct. 18, 2010

(65) Prior Publication Data
US 2011/0116054 A1    May 19, 2011

(30) Foreign Application Priority Data

Nov. 13, 2009  (JP) ................................. 2009-259692
Apr. 19, 2010  (JP) ................................. 2010-096318

(51) Int. Cl.
| G03B 21/26 | (2006.01) |
| G02B 26/08 | (2006.01) |
| H04N 3/02 | (2006.01) |
| H04N 3/28 | (2006.01) |

(52) U.S. Cl.
USPC .............. 353/36; 353/30; 359/291; 359/298; 348/195; 348/206; 348/699

(58) Field of Classification Search
USPC .............. 353/36, 30; 359/291, 298; 348/195, 348/206, 699
See application file for complete search history.

(56) References Cited

U.S. PATENT DOCUMENTS

2008/0157412 A1*  7/2008  Kihara et al. .................. 264/1.1
2009/0201589 A1*  8/2009  Freeman ....................... 359/630

FOREIGN PATENT DOCUMENTS

JP         2008-116668         5/2008

* cited by examiner

*Primary Examiner* — Georgia Y Epps
*Assistant Examiner* — Magda Cruz
(74) *Attorney, Agent, or Firm* — Harness, Dickey & Pierce, P.L.C.

(57) ABSTRACT

An optical scanning projector includes: a raster scanning unit that draws an image in a drawing area on a display surface by scanning beams in a first direction on the display surface while scanning beams in a second direction on the display surface that is orthogonal to the first direction; and a vector scanning unit that draws an image by irradiating beams so as to sequentially form segments each connecting two different points positioned on the display surface.

12 Claims, 24 Drawing Sheets

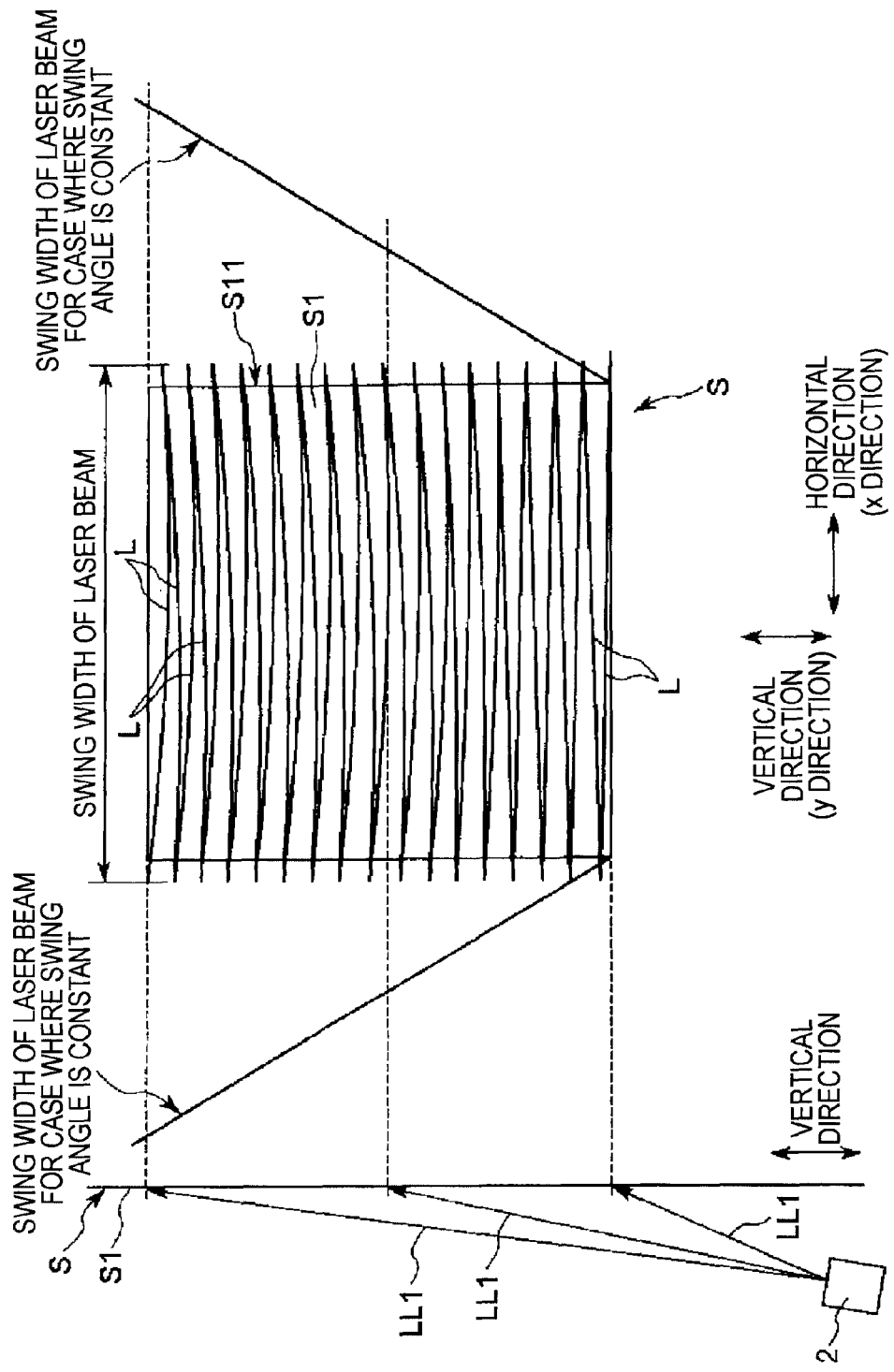

OPTICAL SCANNING PROJECTOR WITH RASTER SCANNING UNIT AND VECTOR SCANNING UNIT

BACKGROUND

1. Technical Field

The present invention relates to an optical scanning projector.

2. Related Art

As devices used for displaying a desired image by scanning light on a display surface (drawing area) of a screen, projectors are used. In addition, as such projectors, projectors using an optical scanner that can scan light in one dimension or two dimensions have been known (for example, see JP-A-2008-116668).

The projector disclosed in JP-A-2008-116668 includes a first optical scanner of which the movable plate having a light reflecting portion rotates around the x axis, a second optical scanner of which the movable plate having a light reflecting portion rotates around the y axis, and a light source device that emits light such as a beam, wherein the x axis and the y axis are set so as to be orthogonal to each other. In such projectors, light is two-dimensionally scanned by scanning the light emitted from the light source device by using the first optical scanner and scanning the scanned light by using the second optical scanner again. Accordingly, a desired image is displayed on the screen.

As described above, the projector disclosed in JP-A-2008-116668 is configured so as to draw an image by scanning light in the y-axis direction while scanning light in the x-axis direction, in other words, by scanning light to the entirety of the drawing area through raster scanning. Through in the raster scanning, an image can be drawn at a high speed. Thus, for example, when a moving image is displayed, the number of frames per unit time can be increased. Accordingly, the raster scanning has an advantage in that a clear image having a smooth motion can be displayed. However, in the raster scanning, light is scanned at a high speed, and the irradiation time for each point positioned in the drawing area is short. Thus, the raster scanning has disadvantages in that the luminance of an image cannot be increased, and it is difficult to clearly display a boundary such as a contour.

As a result, it is difficult for the projector disclosed in JP-A-2008-116668 to display a bright and clear image, and thus an image that can attract an observer's strong interest and attention cannot be displayed (drawn).

SUMMARY

An advantage of some aspects of the invention is that it provides an optical scanning projector capable of displaying (drawing) an image that can attract an observer's strong interest and attention.

According to a first aspect of the invention, there is provided an optical scanning projector including: a raster scanning unit that draws an image in a drawing area on a display surface by scanning beams in a first direction on the display surface while scanning beams in a second direction on the display surface that is orthogonal to the first direction; and a vector scanning unit that draws an image by irradiating beams so as to sequentially form segments each connecting two different points positioned on the display surface.

Accordingly, an optical scanning projector can be provided which can display (draw) an image that can attract an observer's strong interest and attention.

According to a second aspect of the invention, there is provided an optical scanning projector including: a raster scanning unit that draws an image in a drawing area by performing sub-scanning in a direction different from that of primary scanning while primarily scanning beams on the drawing area that is formed on a display surface; and a vector scanning unit that draws an image by irradiating beams so as to sequentially form segments each connecting two different points positioned on the display surface.

Accordingly, an optical scanning projector can be provided which can display (draw) an image that can attract an observer's strong interest and attention.

In the above-described optical scanning projector, it is preferable that the image drawn by the raster scanning unit and the image drawn by the vector scanning unit at least partially overlap with each other.

In such a case, an image that can distinguishably attract observers' interest and attention can be displayed. Accordingly, particularly when the image is an advertisement such as a commercial or a promotional video, an excellent effect of the advertisement can be demonstrated.

In the above-described optical scanning projector, it is preferable that the vector scanning unit draws an image so as to include an image that displays a contour of the drawing area.

In such a case, the image displayed within the contour becomes a highlighted image. Accordingly, an image (raster image) displayed in the drawing image can attract an observer's attention. Particularly, when the image is an advertisement such as a commercial or a promotional video, an excellent effect of the advertisement can be demonstrated.

In the above-described optical scanning projector, it is preferable that the vector scanning unit draws an image so as to include an image that displays a contour of the image drawn by the raster scanning unit.

In such a case, an image that can distinguishably attract observers' interest and attention can be displayed. Accordingly, particularly when the image is an advertisement such as a commercial or a promotional video, an excellent effect of the advertisement can be demonstrated.

It is preferable that the above-described optical scanning projector further includes a contour detecting unit that detects the contour, and the vector scanning unit displays the contour based on a detection result of the contour detecting unit.

In such a case, the contour of the major portion that is drawn by the raster scanning unit can be displayed more reliably.

In the above-described optical scanning projector, it is preferable that the contour detecting unit detects the contour based on at least one parameter from among hue, chroma, and lightness of adjacent pixels in an image drawn by the raster scanning unit.

As described above, based on the difference in colors, the contour can be detected simply and precisely.

In the above-described optical scanning projector, it is preferable that the contour detecting unit detects a boundary of the adjacent pixels as the contour in a case where the hues of the adjacent pixels are separated from each other by a predetermined gap or more on a chromaticity diagram of an XYZ color coordinate system.

In such a case, the contour can be detected more precisely.

In the above-described optical scanning projector, it is preferable that coordinate data of the contour is included in image data of the image that is drawn by the raster scanning unit, and that the vector scanning unit displays the contour based on the coordinate data of the contour.

In such a case, the contour can be displayed more reliably.

In the above-described optical scanning projector, it is preferable that the vector scanning unit draws an image that includes at least one of a text, a number, and a symbol.

In such a case, an image that can distinguishably attract observers' interest and attention can be displayed. Accordingly, particularly when the image is an advertisement such as a commercial or a promotional video, an excellent effect of the advertisement can be demonstrated.

In the above-described optical scanning projector, it is preferable that luminance per unit area of the vector scanning unit within the drawing area is higher than luminance per unit area of the raster scanning unit within the drawing area.

In such a case, the image displayed in the drawing area becomes an image that can more distinguishably attract an observer's interest and attention.

In the above-described optical scanning projector, it is preferable that each of the raster scanning unit and the vector scanning unit has a light emitting section that emits a laser beam and an optical scanner, in which a movable plate having a light reflecting portion reflecting the laser emitted from the light emitting section is arranged so as to be rotatable in at least one direction or two directions orthogonal to each other, having an optical scanner that scans the laser reflected from the light reflecting portion in accordance with the rotation to the drawing area.

In such a case, the raster scanning unit can be configured in a relatively simple manner.

In the above-described optical scanning projector, it is preferable that the raster scanning unit includes a deformation correcting section that corrects deformation of an image displayed in the drawing area.

In such a case, an image of which the deformation is corrected can be displayed on the display surface.

It is preferable that the above-described optical scanning projector further includes a casing, and the raster scanning unit and the vector scanning unit are arranged within the casing.

In such a case, the optical scanning projector can be formed to be compact.

BRIEF DESCRIPTION OF THE DRAWINGS

The invention will be described with reference to the accompanying drawings, wherein like numbers reference like elements.

FIGS. 24A and 24B are diagrams illustrating the operation of a raster scanning module included in the optical scanning projector according to the third embodiment of the invention, wherein FIG. 24A is a side view, and FIG. 24B is a front view.

DESCRIPTION OF EXEMPLARY EMBODIMENTS

Hereinafter, optical scanning projectors according to preferred embodiments of the invention will be described with reference to the accompanying drawings.

First Embodiment

Figure 1:
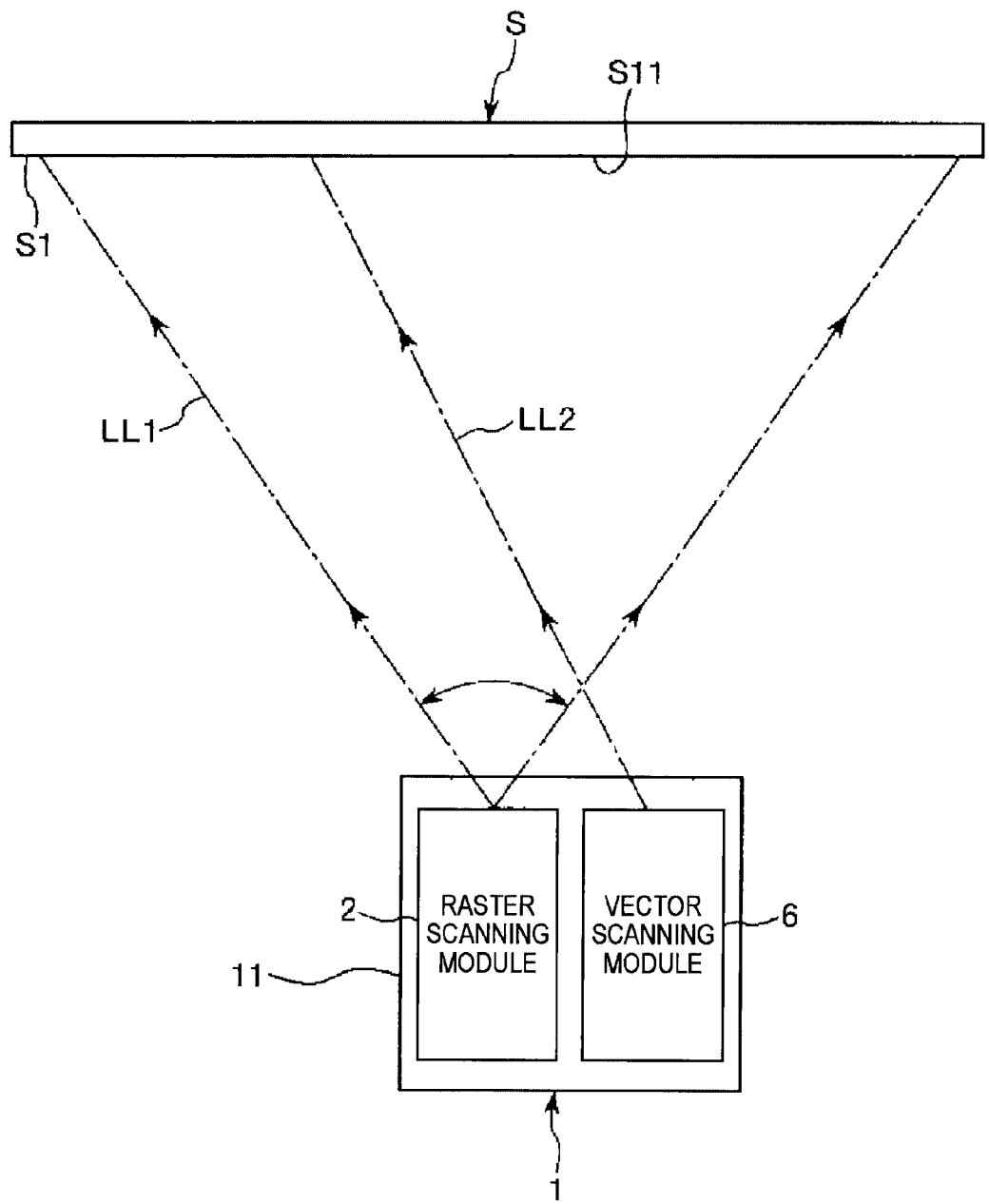
FIG. 1 is a diagram showing an optical scanning projector according to a first embodiment of the invention.
Figure 2:
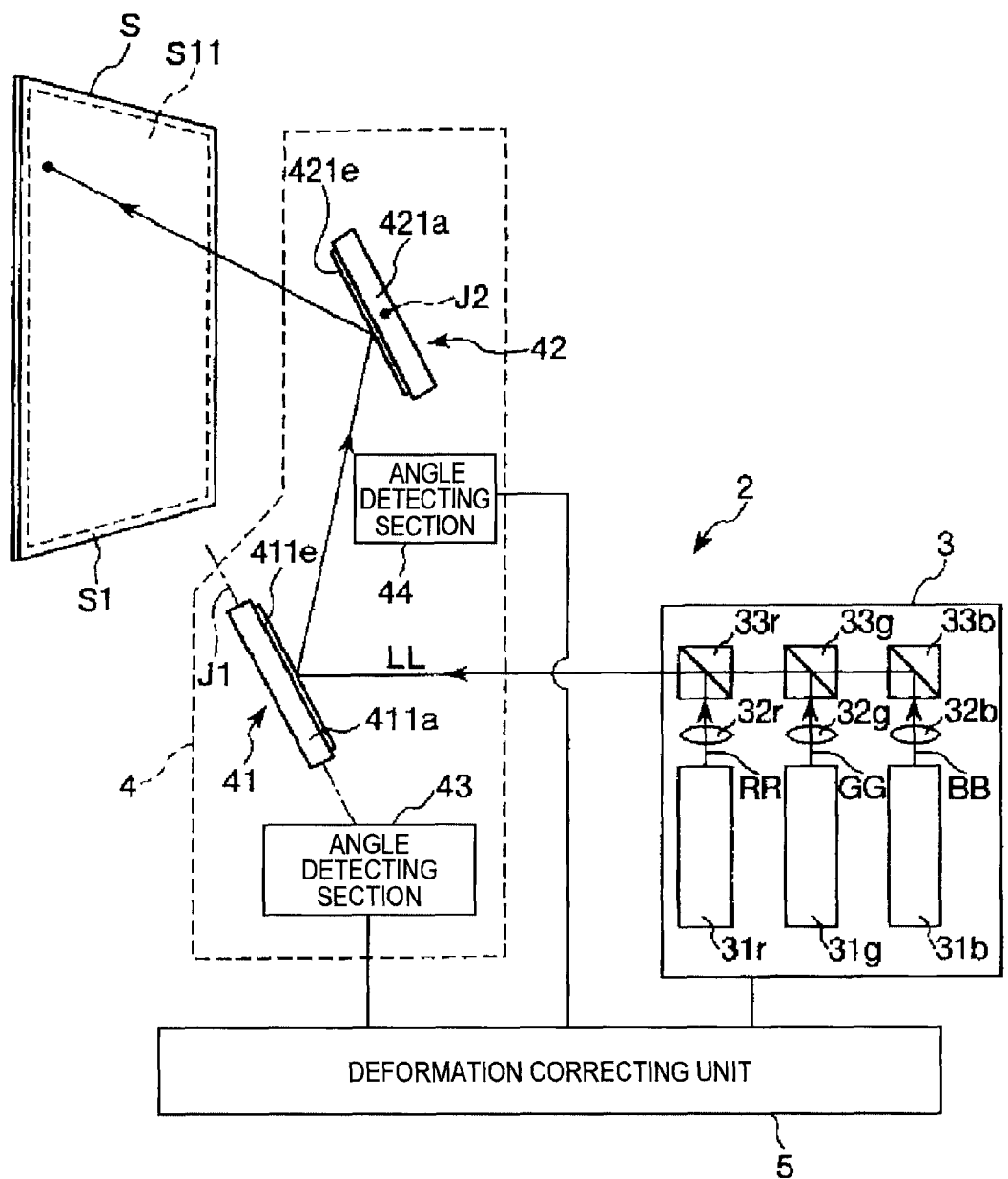
FIG. 2 is a configuration diagram of a raster scanning module shown in FIG. 1.
Figure 3:
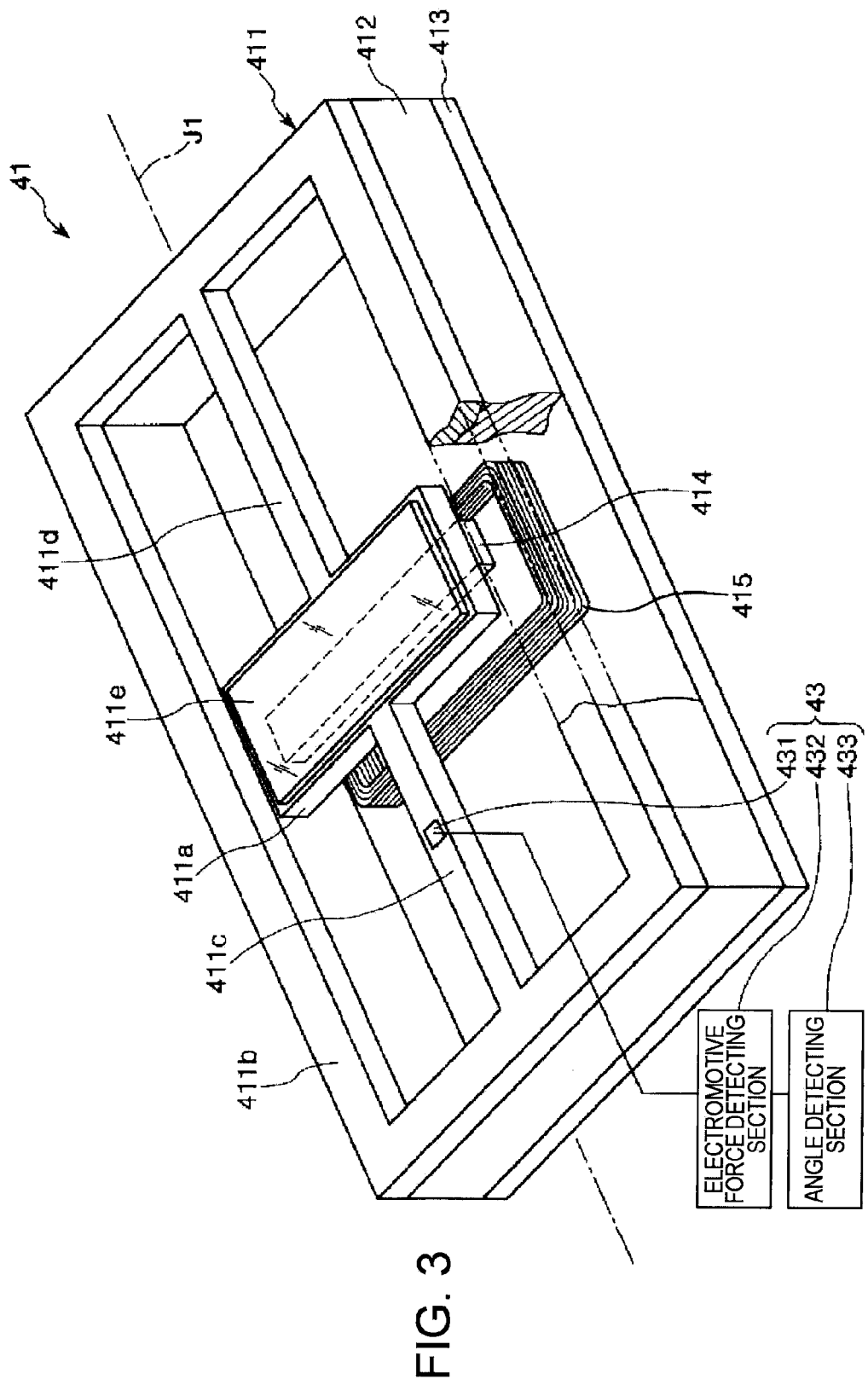
FIG. 3 is a partial cross-sectional perspective view of an optical scanner shown in FIG. 2.
Figure 4A:
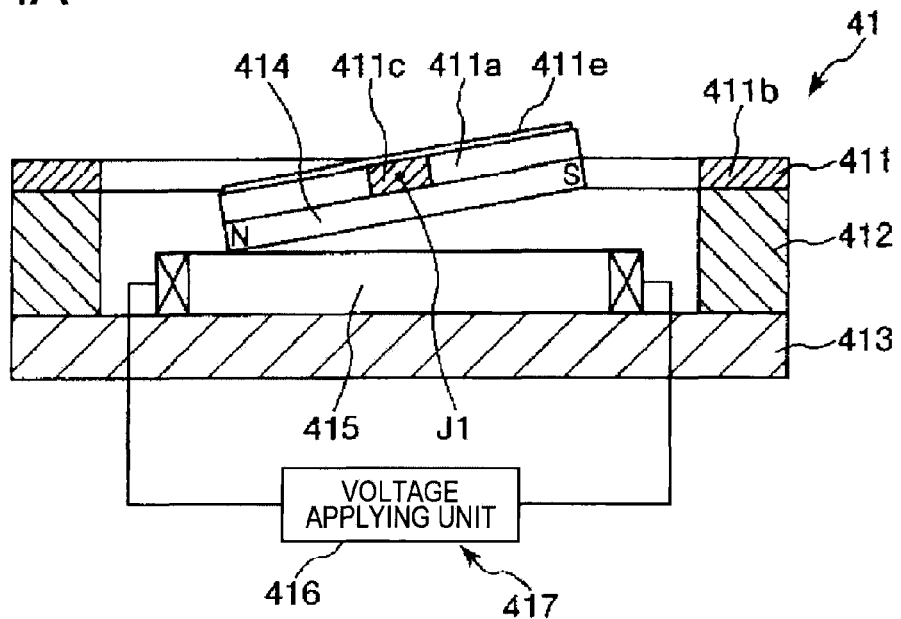
FIGS. 4A and 4B are cross-sectional views illustrating driving of the optical scanner shown in FIG. 3.
Figure 4B:
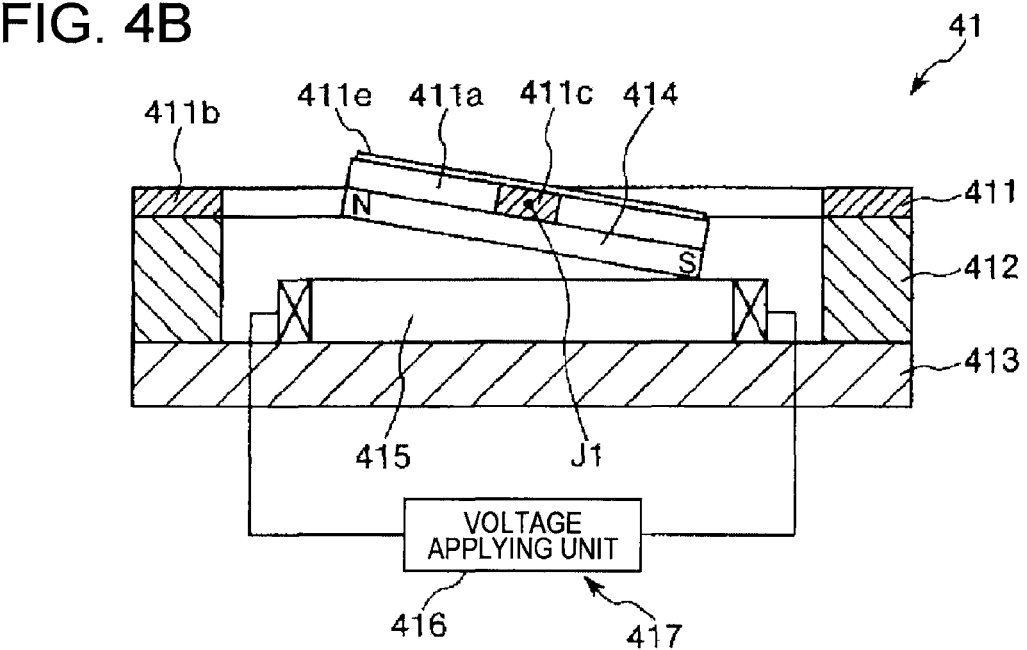
Figure 5:
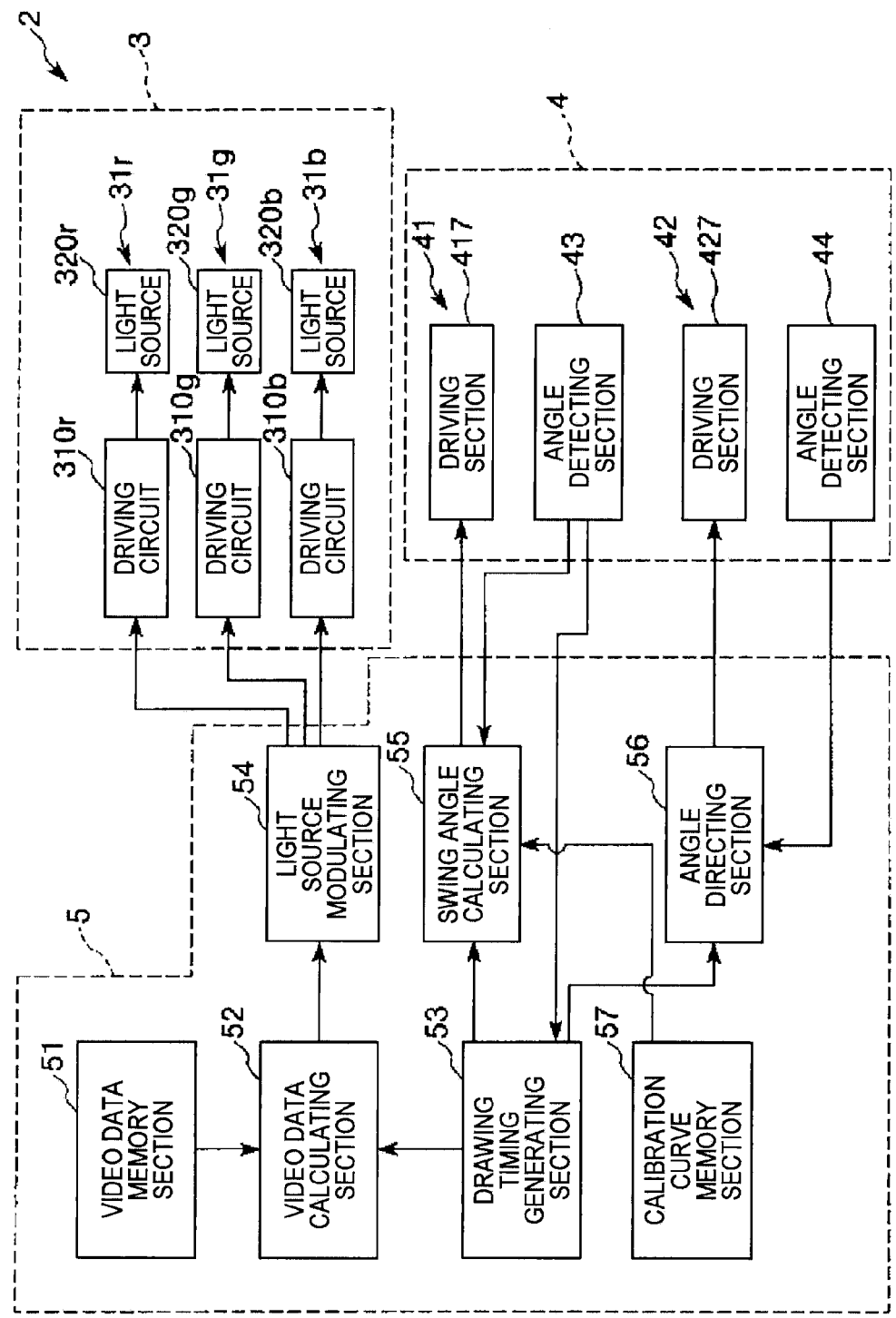
FIG. 5 is a block diagram representing a bending correcting unit, and light scanning unit, and a light source unit of the raster scanning module shown in FIG. 2.
Figures 6A, 6B:
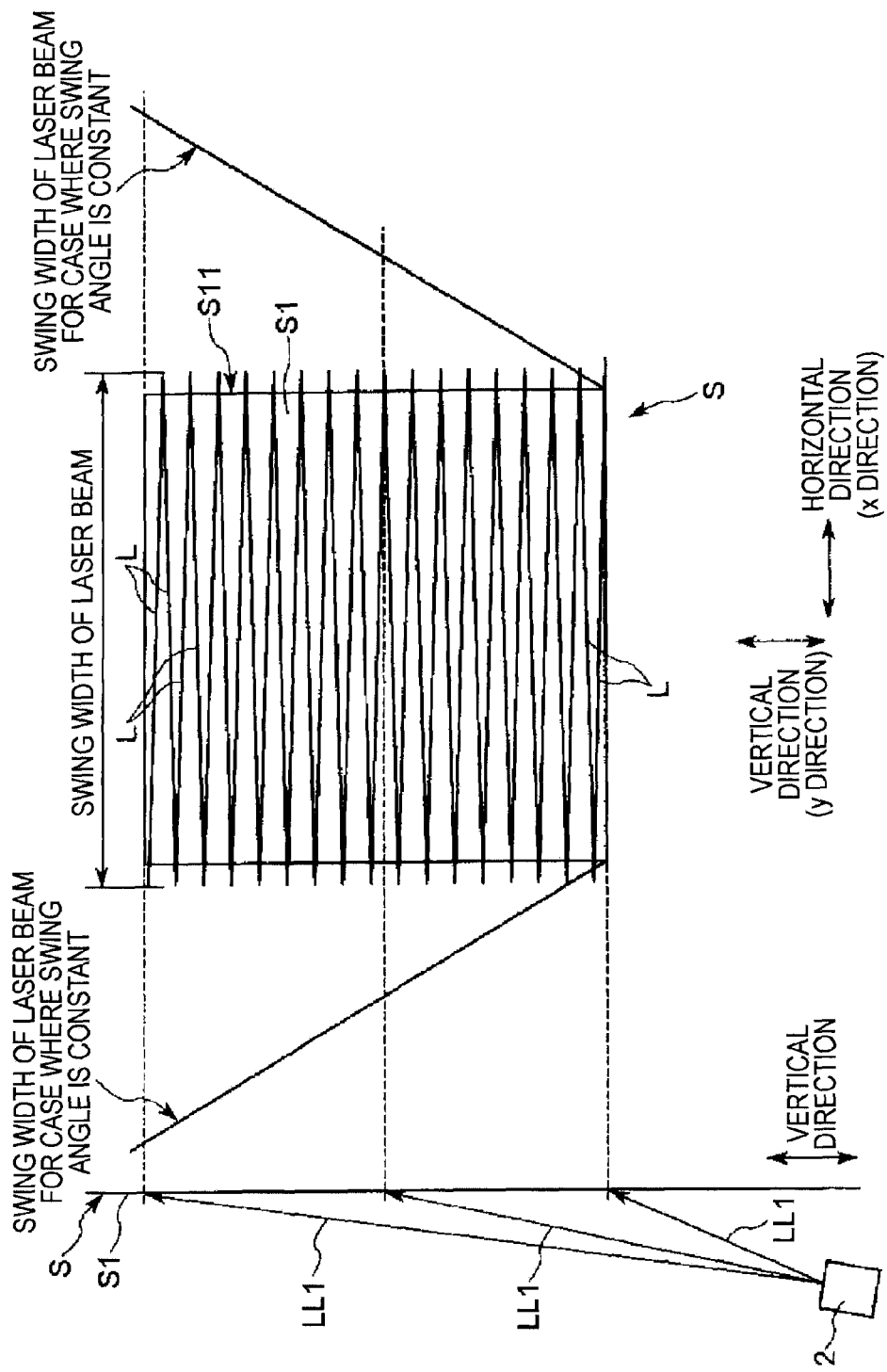
FIGS. 6A and 6B are diagrams illustrating the operation of the raster scanning module shown in FIG. 2 (FIG. 6A is a side view, and FIG. 6B is a front view).
Figure 7:
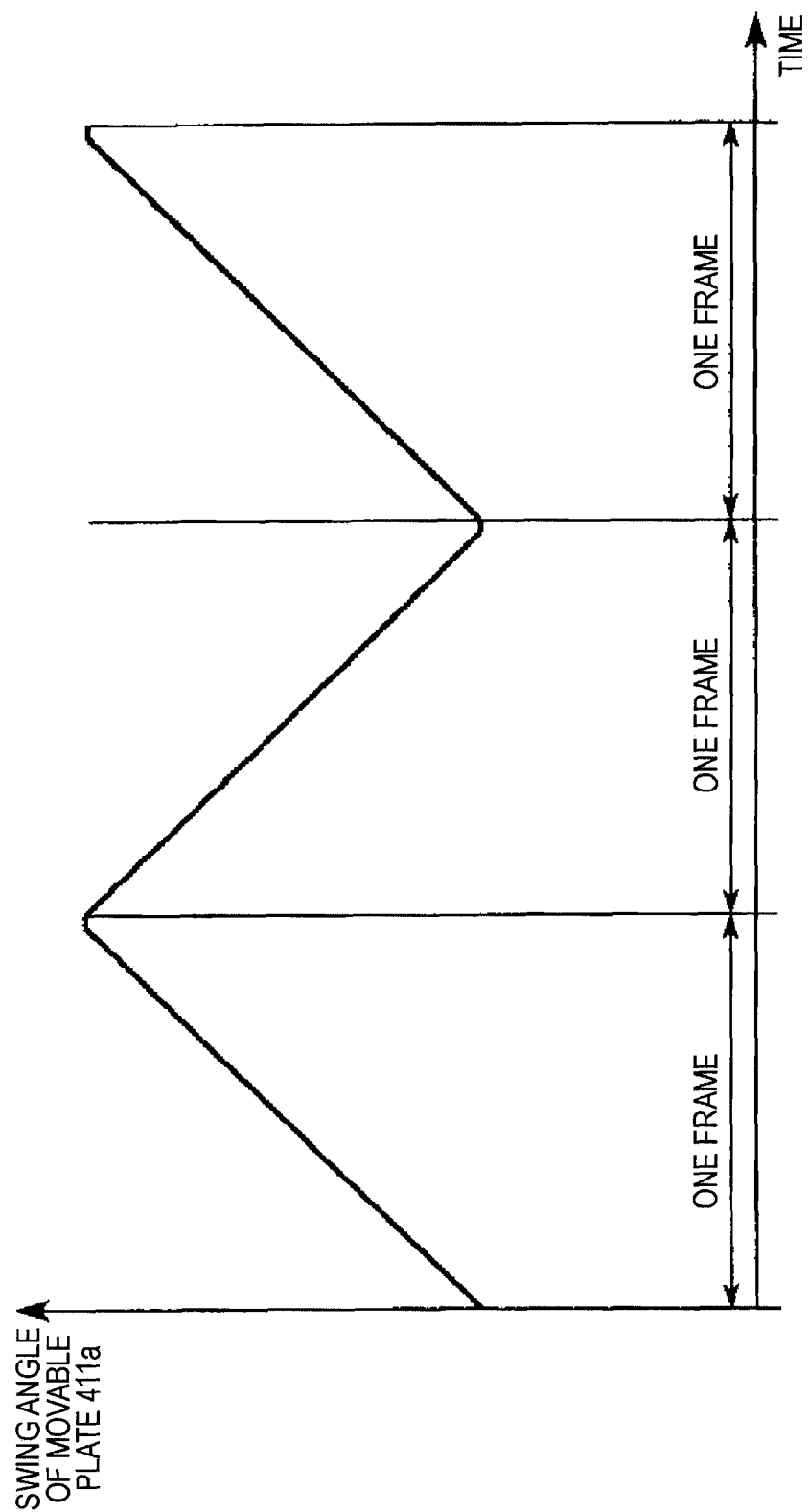
FIG. 7 is a graph representing the swing angle (temporal change in the swing angle) of a movable plate of an optical scanner (an optical scanner for horizontal scanning) during the operation of the raster scanning module shown in FIG. 2.
Figure 8:
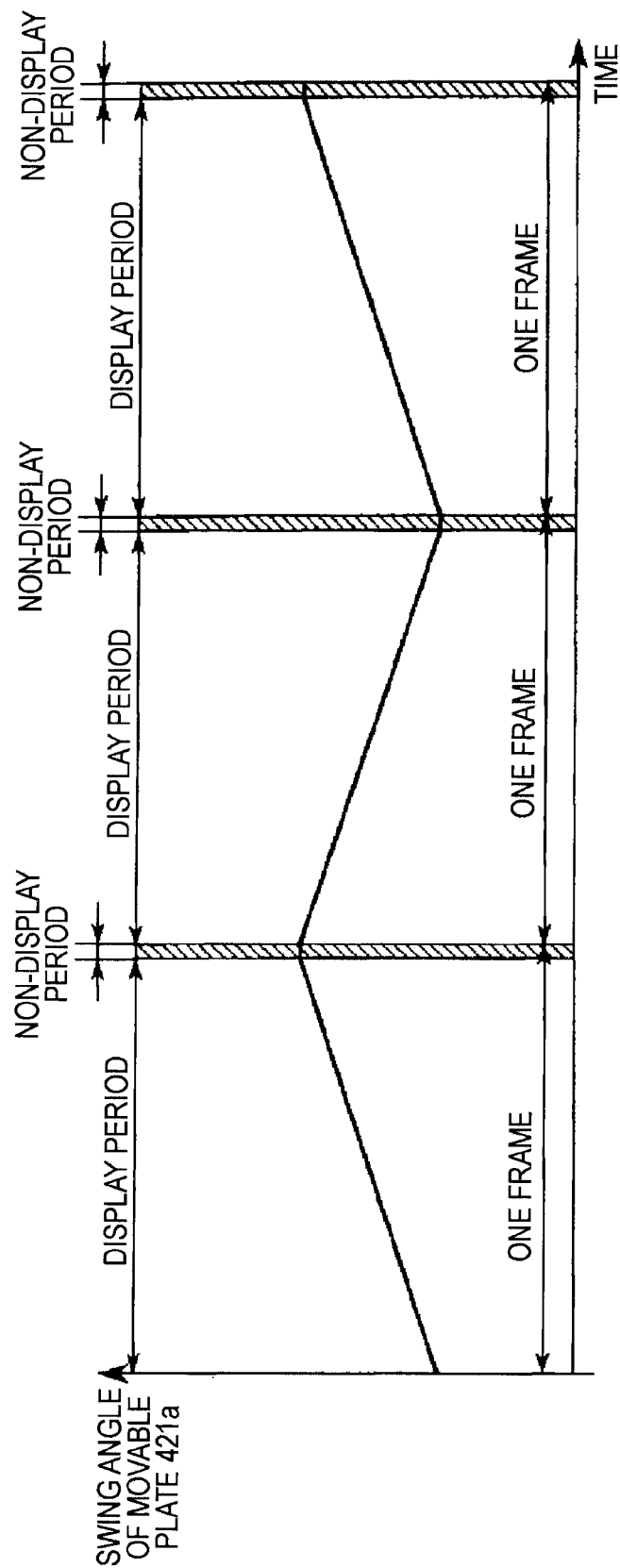
FIG. 8 is a graph representing the angle (temporal change in the angle) of a movable plate of an optical scanner (an optical scanner for vertical scanning) during the operation of the raster scanning module shown in FIG. 2.
Figure 9:
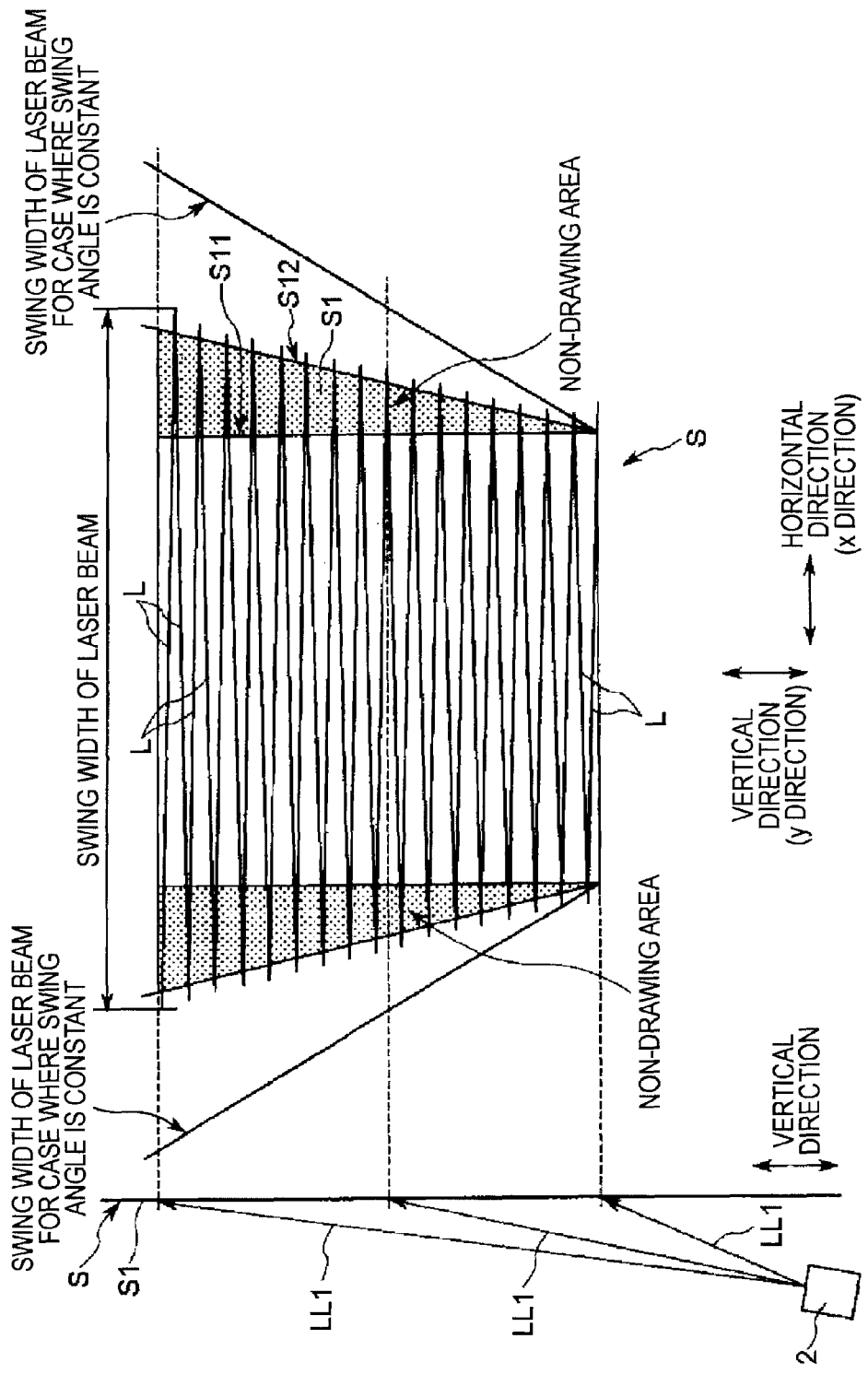
FIGS. 9A and 9B are a modified example of the raster scanning module shown in FIG. 2 and the operation thereof (FIG. 9A is a side view, and FIG. 9B is a front view).
Figure 10:
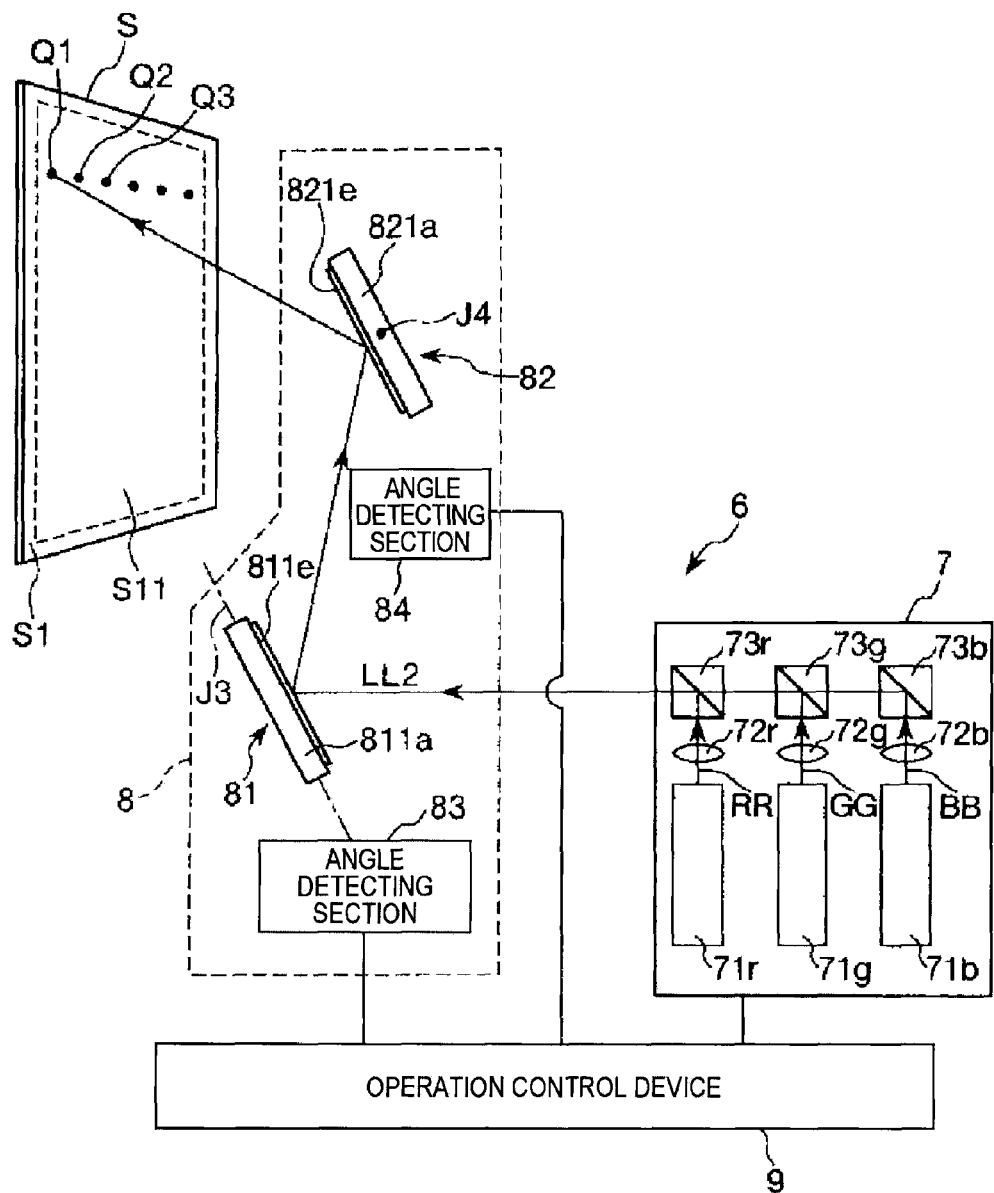
FIG. 10 is a configuration diagram of the vector scanning module shown in FIG. 1.
Figure 11:
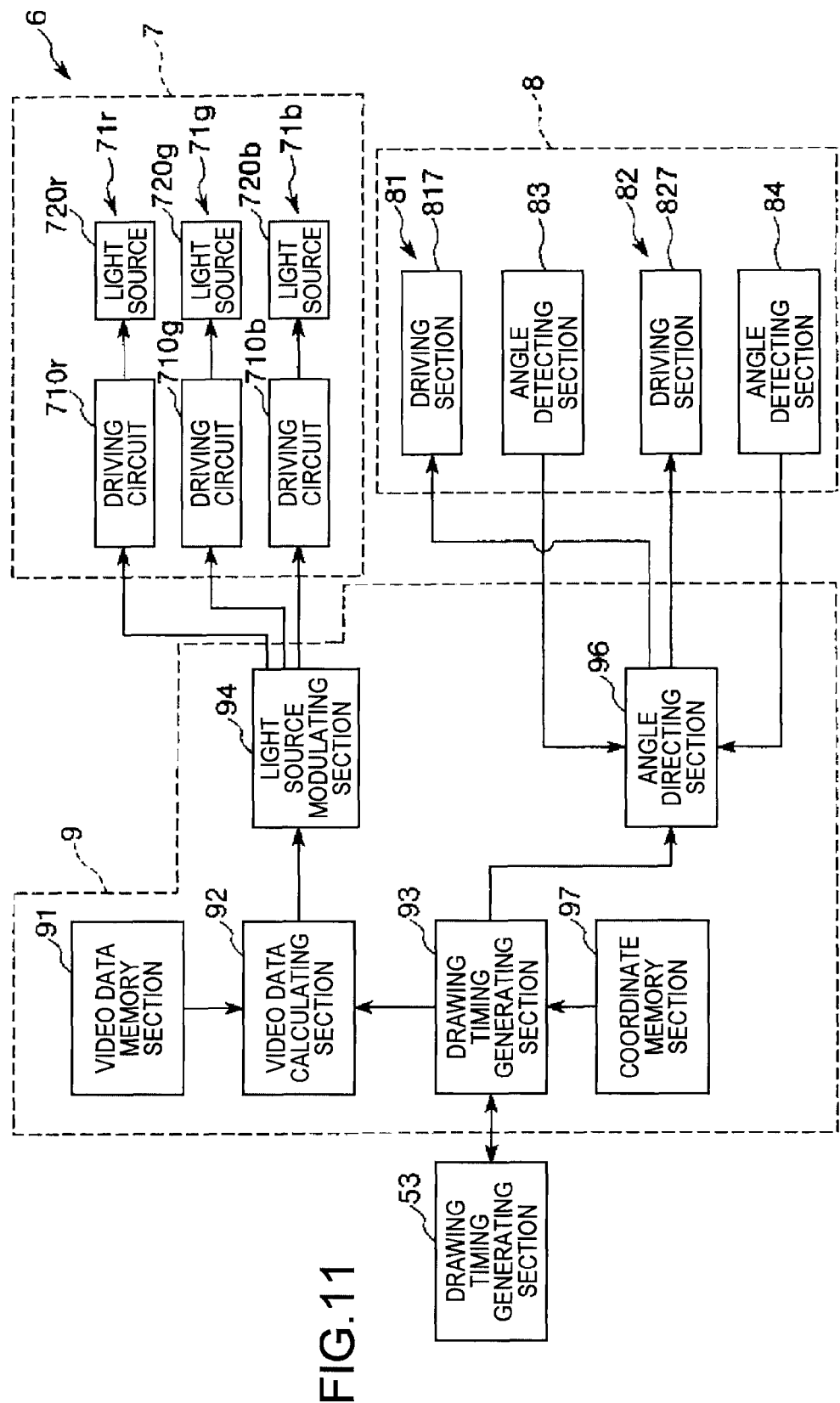
FIG. 11 is an operation control device, a light scanning unit, and a light source unit of a vector scanning module shown in FIG. 10.
Figure 12:
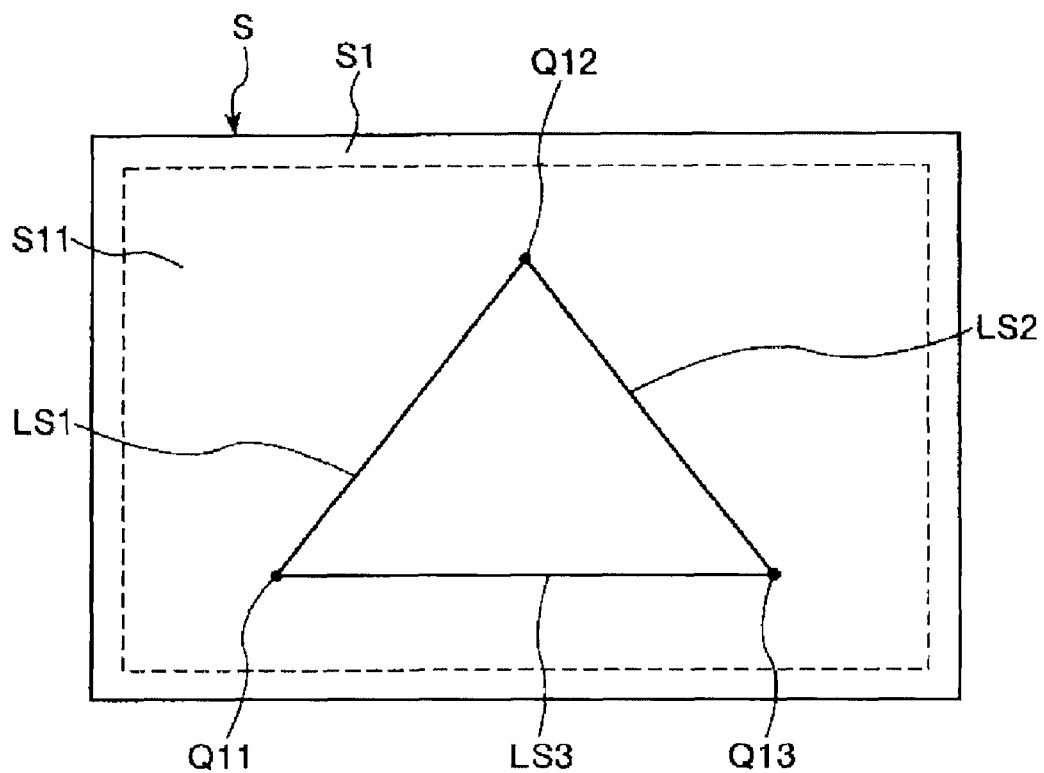
FIG. 12 is a diagram illustrating the operation of the vector scanning module shown in FIG. 10.
Figure 15A:
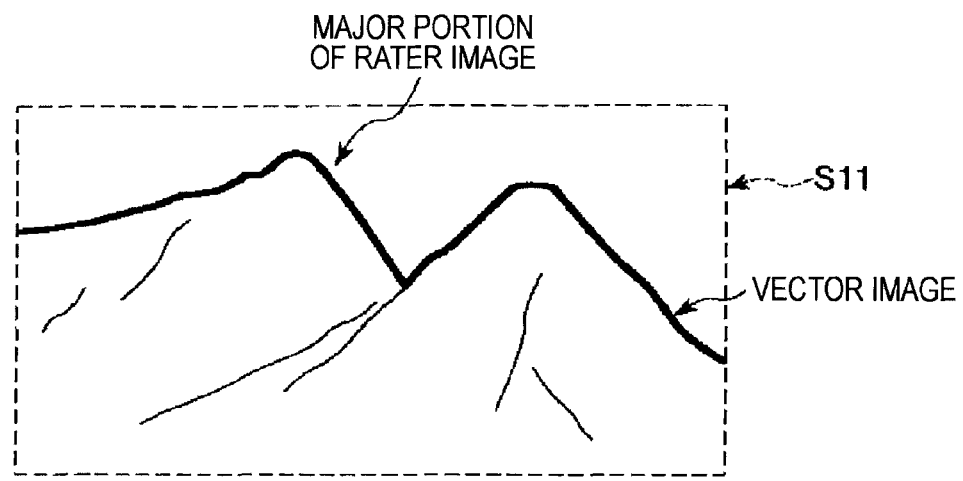
FIGS. 15A to 15C are diagrams representing examples of images drawn by the optical scanning projector shown in FIG. 1.
Figure 15B:
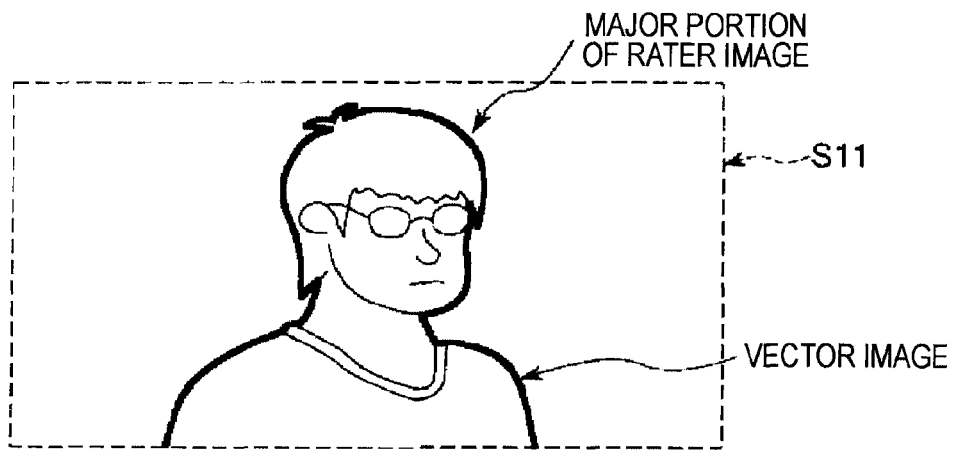
Figure 15C:
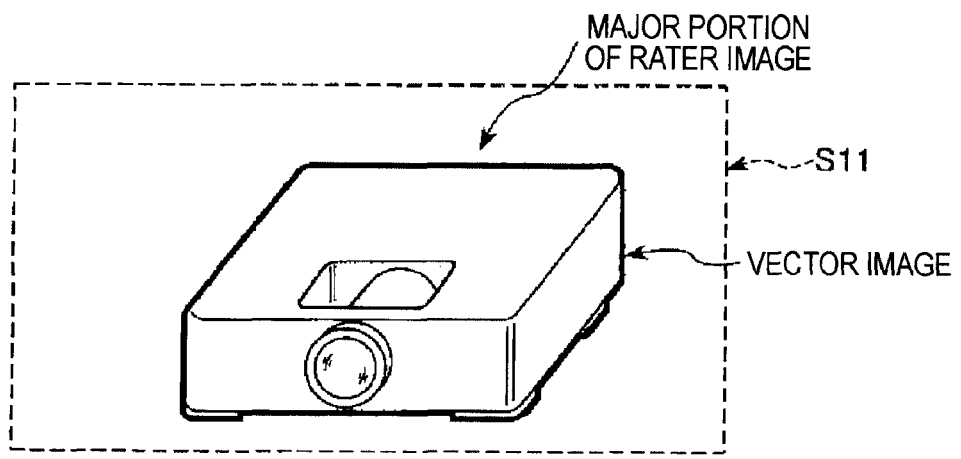
Figure 16:
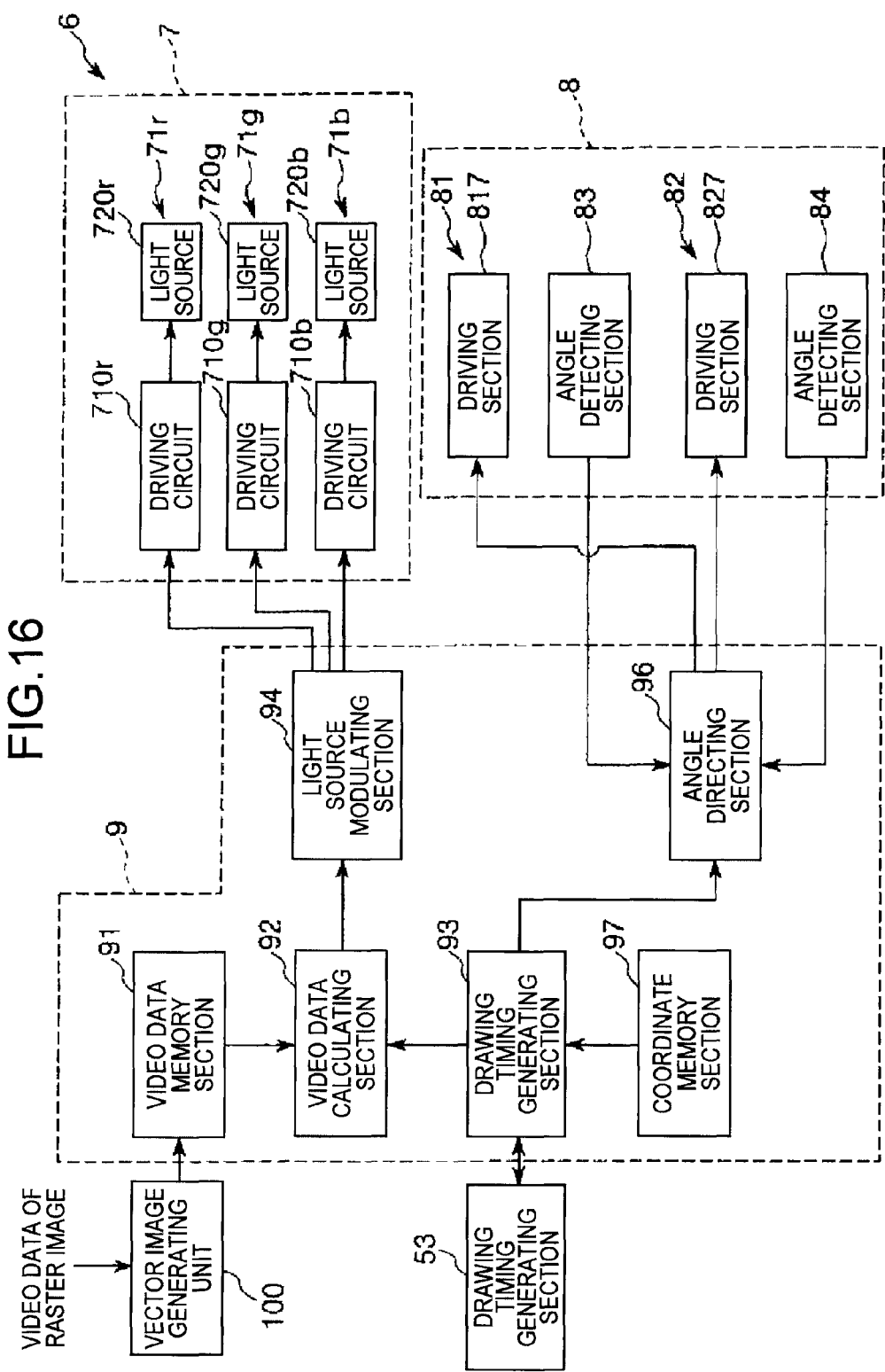
FIG. 16 is a block diagram representing the configuration for generating video data of a vector image.
Figure 17:
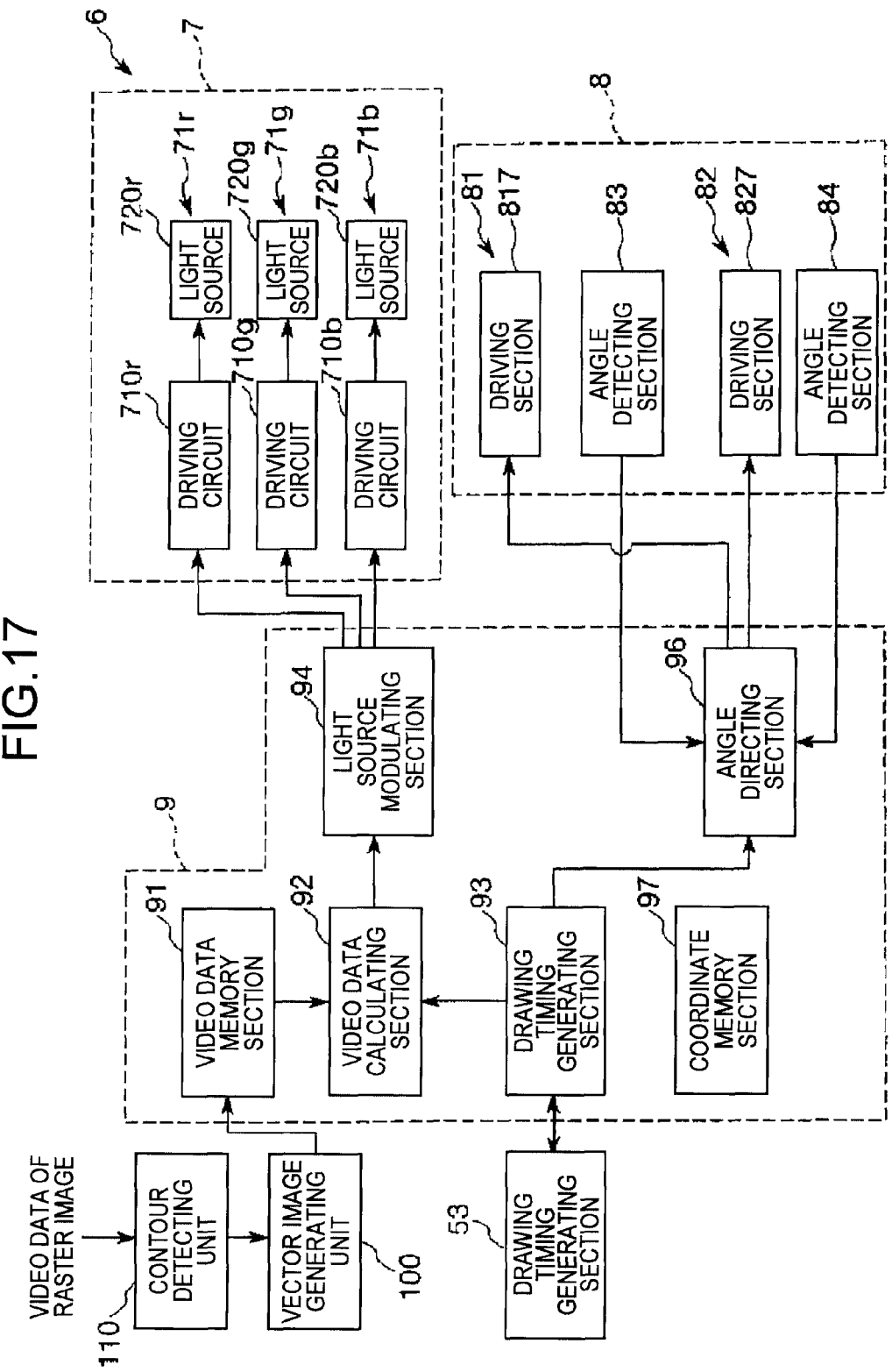
FIG. 17 is a block diagram representing the configuration for generating video data of a vector image.

FIG. 1 is a diagram showing an optical scanning projector according to a first embodiment of the invention. FIG. 2 is a configuration diagram of a raster scanning module shown in FIG. 1. FIG. 3 is a partial cross-sectional perspective view of an optical scanner shown in FIG. 2. FIGS. 4A and 4B are cross-sectional views illustrating driving of the optical scanner shown in FIG. 3. FIG. 5 is a block diagram representing a bending correcting unit, and light scanning unit, and a light source unit of the raster scanning module shown in FIG. 2. FIGS. 6A and 6B are diagrams illustrating the operation of the raster scanning module shown in FIG. 2 (FIG. 6A is a side view, and FIG. 6B is a front view.). FIG. 7 is a graph representing the swing angle (temporal change in the swing angle) of a movable plate of an optical scanner (an optical scanner for horizontal scanning) during the operation of the raster scanning module shown in FIG. 2. FIG. 8 is a graph representing the angle (temporal change in the angle) of a movable plate of an optical scanner (an optical scanner for vertical scanning) during the operation of the raster scanning module shown in FIG. 2. FIGS. 9A and 9B show a modified example of the raster scanning module shown in FIG. 2 and the operation thereof (FIG. 9A is a side view, and FIG. 9B is a front view). FIG. 10 is a configuration diagram of the vector scanning module shown in FIG. 1. FIG. 11 is an operation control device, a light scanning unit, and a light source unit of a vector scanning module shown in FIG. 10. FIG. 12 is a diagram illustrating the operation of the vector scanning module shown in FIG. 10. FIGS. 13, 14, 15A to 15C, and 18 are diagrams representing examples of images drawn by the optical scanning projector shown in FIG. 1. FIGS. 16 and 17 are block diagrams representing the configurations for generating video data of a vector image. Hereinafter, for convenience of the description, the upper side, the lower side, the right side, and the left side in FIGS. 3, 4A, 4B, 6A, 6B, 9A, and 9B will be referred to as "up", "down", "right", and "left".

The optical scanning projector 1 shown in FIG. 1 is an apparatus that displays (draws) a predetermined image such as a still image or a moving image (particularly, an advertisement such as a commercial or a promotional video) in a drawing area S11, for example, that is formed on a display surface S1 of a screen S.

The above-described optical scanning projector 1 has a raster scanning module (raster scanning unit) 2 that draws an image (hereinafter, also referred to as a "raster image") by scanning beams into the drawing area S11 through raster scanning and a vector scanning module (vector scanning unit) 6 that draws an image (hereinafter, referred to as a "vector image") by scanning (irradiating) beams into the drawing area S11 through vector scanning. Thus, the optical scanning projector 1 is configured so as to display an image that strongly attracts an observer's interest and attention in the drawing area S11 by overlapping the raster image and the vector image on the drawing area S11.

First, the raster scanning module 2 will be described.

As shown in FIG. 2, the raster scanning module 2 has: a light source unit (light emitting section) 3 that emits a laser beam (luminous flux); an light scanning unit 4 that scans light emitted from the light source unit 3 toward the drawing area S11; and a deformation correcting unit 5 that corrects (trapezoidal correction) deformation of an image displayed on the display surface S1. By employing the above-described configuration, the raster scanning module 2 can be configured in a relatively simple manner.

The light source unit 3 includes: laser beam sources 31r, 31g, and 31b of each color; collimator lenses 32r, 32g, and 31b and dichroic mirrors 33r, 33g, and 33b that are arranged in correspondence with the laser beam sources 31r, 31g, and 31b of each color.

In addition, as shown in FIG. 5, the laser beam sources 31r, 31g, and 31b of each color have driving circuits 310r, 310g, and 310b and a red light source 320r, a green light source 320g, and a blue light source 320b. The laser beam sources 31r, 31g, and 31b of each color, as shown in FIG. 3, emit a laser beam RR, GG, and BB of red color, green color, and blue color. The laser beams RR, GG, and BB are emitted in a state of being modulated in accordance with a driving signal, which is transmitted from a light source modulating section 54 of the deformation correcting unit 5 to be described later, and are made parallel by the collimator lenses 32r, 32g, and 32b, which are collimator optical devices, so as to be thin beams.

The dichroic mirrors 33r, 33g, and 33b have characteristics of reflecting the red laser beam RR, the green laser beam GG, and the blue laser beam BB and emit one laser beam (ray) LL1 by combining the laser beams RR, GG, and BB of each color together.

Instead of the collimator lenses 32r, 32g, and 32b, collimator mirrors may be used. Even in such a case, thin beams having parallel luminous fluxes can be formed. Furthermore, when parallel beams are emitted from the laser beam sources 31r, 31g, 31b of each color, the collimator lenses 32r, 32g, and 32b can be omitted. Here, the laser beam sources 31r, 31g, and 31b may be substituted by light sources such as light emitting diodes that generate the same luminous fluxes.

In addition, the order of the laser beam sources 31r, 31g, and 31b, the collimator lenses 32r, 32g, and 32b, and the dichroic mirrors 33r, 33g, and 33b that is represented in FIG. 2 is merely one example. Thus, the order thereof may be freely set whilst maintaining the combination of each color (the laser beam source 31r, the collimator lens 32r, and the dichroic mirror 33r for the red color, the laser beam source 31g, the collimator lens 32g, and the dichroic mirror 33g for the green color, and the laser beam source 31b, the collimator lens 32b, and the dichroic mirror 33b for the blue color). For example, a combination of the blue color, the red color, and the green color from the order of closeness to the light scanning unit 4 may be employed.

Next, the light scanning unit 4 will be described.

The light scanning unit 4 performs two-dimensional scanning by scanning (horizontal scanning; main scanning) the laser beam LL1 emitted from the light source unit 3 for the drawing area S11 in the horizontal direction (the x direction) and scanning (vertical scanning; sub scanning) the laser beam LL1 for the drawing area S11 in the vertical direction (the y direction that is perpendicular to the x direction) at a scanning speed slower than that in the horizontal direction.

This light scanning unit 4 includes: an optical scanner (x-direction scanning unit) 41 that is a horizontal scanning mirror that scans the laser beam LL1 emitted from the light source unit 3 in the horizontal direction (the x direction) for the drawing area S11; an angle detecting section (behavior detecting unit) 43 that detects the angle (behavior) of a movable plate 411a of the optical scanner 41 to be described later; an optical scanner (y-direction scanner) 42 that is a vertical scanning mirror that scans the laser beam LL1 emitted from the light source unit 3 in the vertical direction for the drawing area S11; and an angle detecting section (behavior detecting unit) 44 that detects the angle (behavior) of a movable plate 421a of the optical scanner 42 to be described later.

Hereinafter, the configurations of the optical scanners 41 and 42 will be described. The optical scanners 41 and 42 have the same configuration. Thus, hereinafter, the optical scanner 41 will be representatively described, and the description of the optical scanner 42 will be omitted.

As shown in FIG. 3, the optical scanner 41 is a so-called vibration system with one degree of freedom. The optical scanner 41 includes a base body 411, an opposing substrate 413 that is arranged so as to face the lower face of the base body 411, and a spacer member 412 that is arranged between the base body 411 and the opposing substrate 413.

The base body 411 has: a movable plate 411a, a support portion 411b that supports the movable plate 411a to be rotatable; and one pair of connection portions 411c and 411d that connect the movable plate 411a and the support portion 411b together.

The movable plate 411a forms an approximately rectangular shape in the plan view. On the upper face of the movable plate 411a, a light reflecting portion (mirror) 411e that has light reflectivity is arranged. The front face (upper face) of the light reflecting portion 411e configures a reflective face that reflects light. The light reflecting portion 411e, for example, is configured by a film of metal such as Al or Ni. In addition, on the lower face of the movable plate 411a, a permanent magnet 414 is arranged.

The support portion 411b is arranged so as to surround the outer periphery of the movable plate 411a in the plan view of the movable plate 411a. In other words, the support portion 411b forms a frame shape, and on the inner side thereof, the movable plate 411a is positioned.

The connection portion 411c connects the movable plate 411a and the support portion 411b on the left side of the movable plate 411a, and the connection portion 411d connects the movable plate 411a and the support portion 411b on the right side of the movable plate 411a.

Each of the connection portions 411c and 411d forms a longitudinal shape. In addition, each of the connection portions 411c and 411d can be elastically deformed. The one pair of the connection portions 411c and 411d described above is arranged so as to have the same axis, and the movable plate 411a rotates relative to the support portion 411b around the axis (hereinafter, it is referred to as a "rotation center axis J1").

The above-described base body 411, for example, is formed from silicon as its major material, and the movable plate 411a, the support portion 411b, and the connection portions 411c and 411d are integrally formed. As described above, by using the silicon as its major material, a superior rotation characteristic can be implemented, and a superior durability can be demonstrated. In addition, a fine process (processing) can be performed, and the optical scanner 41 can be miniaturized.

The spacer member 412 forms a frame shape, and the upper face of the spacer member 412 is bonded to the lower face of the base body 411. In addition, the spacer member 412 is formed to have the same shape as that of the support portion 411b in the plan view of the movable plate 411a. Such a spacer member 412, for example, is composed of various types of glass, various ceramics, silicon, $SiO_2$, or the like.

In addition, a method of bonding the spacer member 412 and the base body 411 is not particularly limited. For example, the spacer member 412 and the base body 411 may be bonded together through another member such as an adhesive agent. In addition, anode bonding or the like may be used depending on the constituent member of the spacer member 412.

The opposing plate 413, similarly to the spacer member 412, for example, is composed of various types of glass, silicon, $SiO_2$, or the like. In a portion of the upper face of the above-described opposing substrate 413 that faces the movable plate 411a, a coil 415 is arranged.

The permanent magnet 414 forms a plate pole shape and is arranged along the lower face of the movable plate 411a. The above-described permanent magnet 414 is magnetized in the direction perpendicular to the rotation center axis J1 in the plan view of the movable plate 411a. In other words, the permanent magnet 414 is arranged such that a segment connecting both the poles (the S pole and the N pole) thereof is perpendicular to the rotation center axis J1.

The above-described permanent magnet 414 is not particularly limited. Thus, as the permanent magnet 414, a neodymium magnet, a ferrite magnet, a samarium-cobalt magnet, an alnico magnet, or the like can be used.

The coil 415 is arranged so as to surround the outer periphery of the permanent magnet 414 in the plan view of the movable plate 411a.

In addition, the optical scanner 41 has a voltage applying unit 416 that applies a voltage to the coil 415. The voltage applying unit 416 is configured so as to adjust (change) each condition such as a voltage value of the voltage to be applied or a frequency. A driving section 417 that rotates the movable plate 411a is configured by the voltage applying unit 416, the coil 415, and the permanent magnet 414.

A predetermined voltage is applied to the coil 415 by the voltage applying unit 416 under the control of the deformation correcting unit 5, and a predetermined current flows through the coil 415.

For example, when an alternating voltage is applied to the coil 415 by the voltage applying unit 416 under the control of the deformation correcting unit 5, a current flows in accordance with the applied voltage. Accordingly, a magnetic field in the thickness direction of the movable plate 411a is generated, and the direction of the magnetic field is periodically switched. In other words, a state A in which an approximately upper side of the coil 415 is the S pole and an approximately lower side thereof is the N pole and a state B in which an approximately upper side of the coil 415 is the N pole and an approximately lower side thereof is the S pole are alternately switched.

In the state A, as shown in FIG. 4A, the right side of the permanent magnet 414 is displaced to the upper side in accordance with a repulsion force against the magnetic field that is generated by conduction of the coil 415, and the left side of the permanent magnet 414 is displaced to the lower side in accordance with a suction force for the magnetic field. Accordingly, the movable plate 411a is rotated in the counterclockwise direction of the movable plate 411a so as to be tilted.

On the contrary, in the state B, as shown in FIG. 4B, the right side of the permanent magnet 414 is displaced to the lower side, and the left side of the permanent magnet 414 is displaced to the upper side. Accordingly, the movable plate 411a is rotated in the clockwise direction so as to be tilted.

By alternately repeating the states A and B described above, the movable plate 411a rotates (vibrates) around the rotation center axis J1 while deforming the connection portions 411c and 411d by twisting.

In addition, through the control of the deformation correcting unit 5, the flowing current can be adjusted by adjusting the voltage applied to the coil 415 by the voltage applying unit 416. Accordingly, the swing angle (amplitude) from the rotation center axis J1 of the movable plate 411a (the reflective face of the light reflecting portion 411e) as the center can be adjusted.

The configuration of the above-described optical scanner 41 is not particularly limited as long as it allows the movable plate 411a to be able to rotate. For example, as the driving method, instead of electromagnetic driving using a coil 415 and a permanent magnet 414, piezoelectric driving, for example, using a piezoelectric device or electrostatic driving using an electrostatic attractive force may be used.

As shown in FIG. 2, the optical scanners 41 and 42 having the above-described configuration are arranged so as to have rotation center axes J1 and J2 that are perpendicular to each other. By arranging the optical scanners 41 and 42 as described above, the laser beam LL1 emitted from the light source unit 3 can be scanned in two dimensions (in two directions (the x direction and the y direction) that are perpendicular to each other) in the drawing area S11. Accordingly, a two-dimensional image (raster image) can be drawn in the drawing area S11 by employing a relatively simple configuration.

Described in detail, the laser beam LL1 emitted from the light source unit 3 is reflected from the reflective face of the light reflecting portion 411e of the optical scanner 41, then is reflected from the reflective face of the light reflecting portion 421e of the optical scanner 42, and then is projected (irradiated) to the drawing area S11 of the screen S. Then, by rotating the light reflecting portion 411e of the optical scanner 41 and rotating the light reflecting portion 421e of the optical scanner 42 at an angular velocity that is slower than the angular velocity (speed) of the light reflecting portion 411e, the laser beam LL1 emitted from the light source unit 3 scans the drawing area S11 in the horizontal direction and scans the drawing area S11 in the vertical direction at a scanning speed that is slower than that in the horizontal direction. Accordingly, the laser beam LL1 emitted from the light source unit 3 two-dimensionally scans the drawing area S11, whereby an image is drawn in the drawing area S11.

Here, in order to rotate the light reflecting portion 421e of the optical scanner 42 at an angular velocity that is slower than that of the light reflecting portion 411e of the optical scanner 41, it is preferable that the optical scanner 41 is driven to resonate by using resonance, and the optical scanner 42 is driven not to resonate by not using resonance.

In addition, the laser beam LL1 emitted from the light source unit 3 is configured so as to be reflected first from the light reflecting portion 421e of the optical scanner 42, and then be reflected from the light reflecting portion 411e of the optical scanner 41. In other words, it is configured such that the vertical scanning is performed first, and then, the horizontal scanning is performed.

Next, an angle detecting section 43 that detects the angle of the movable plate 411a of the optical scanner 41 will be described. Here, an angle detecting section 44 that detects the angle of the movable plate 421a of the optical scanner 42 has the same configuration as that of the angle detecting section 43, and the description thereof is omitted.

As shown in FIG. 3, the angle detecting section 43 includes: a piezoelectric device 431 that is arranged on the connection portion 411c of the optical scanner 41; an electromotive force detecting section 432 that detects an electromotive force generated by the piezoelectric device 431; and an angle detecting section 433 that acquires the angle (detects the behavior) of the movable plate 411a based on the detection result of the electromotive force detecting section 432.

When the connection portion 411c is deformed by twisting in accordance with the rotation of the movable plate 411a, the piezoelectric device 431 is deformed in accordance with the deformation of the connection portion 411c. When being deformed from a natural state in which no external force is applied, the piezoelectric device 431 has the characteristic of generating an electromotive force having the magnitude according to the amount of the deformation. Accordingly, the angle detecting section 433 acquires the degree of twist of the connection portion 411c based on the magnitude of the electromotive force detected by the electromotive force detecting section 432 and acquires the angle of the movable plate 411a (the reflective face of the light reflecting portion 411e) based on the degree of the twist. In addition, the angle detecting section 433 acquires the swing angle from the rotation center axis J1 of the movable plate 411a as the center. A signal that includes information on the angle and the swing angle of the movable plate 411a is transmitted from the angle detecting section 433 to the deformation correcting unit 5.

The angle of the movable plate 411a that is detected as described above may be set as an angle with respect to any state of the optical scanner 41 as a reference (angle 0°). For example, an angle with respect to the initial state (a state in which any voltage is not applied to the coil 415) of the optical scanner 41 as a reference (angle is 0°) may be set as the angle of the movable plate 411a.

In addition, detection of the angle of the above-described movable plate 411a may be performed in real time (continuously) or intermittently. The angle detecting section 43 is not limited to the type that uses the piezoelectric device as in this embodiment as long as it can detect the angle of the movable plate 411a.

Next, the deformation correcting unit 5 will be described.

In the raster scanning module 2, when an image is drawn in the drawing area S11 by using the above-described single pair of the optical scanners 41 and 42, deformation due to a difference in light paths up to the drawing area S11, for example, deformation termed "trapezoidal deformation" in which a length in the horizontal direction is different on the upper side and the lower side of the image displayed in the drawing area S11 occurs. The deformation correcting unit 5 has a function of correcting the above-described deformation of the image.

As represented in FIG. 5, the deformation correcting unit 5 includes: a video data memory section (video data memory unit) 51 that stores video data (image data) that is used for drawing a raster image; a video data calculating section 52; a drawing timing generating section 53; a light source modulating section (optical modulating unit) 54, a swing angle calculating section (amplitude calculating unit) 55; an angle directing section 56; and a calibration curve memory section (calibration curve memory unit) 57 that stores a calibration curve.

The raster scanning module 2 displays (draws) a raster image in the drawing area S11 by performing vertical-direction (y-direction) scanning (hereinafter, also referred simply to as "vertical scanning") in the forward path and the return path and performing horizontal-direction (x-direction) scanning (hereinafter, also referred simply to as "horizontal scanning") in the forward path and the return path.

In addition, when the horizontal scanning is performed, the raster scanning module 2 is configured so as to adjust the swing angle of the movable plate 411a such that the swing width (hereinafter, also referred simply as a "swing width" of the "laser beam (beam) LL1") of the laser beam LL1 in the horizontal direction on the drawing area S11 in a light emitting state (hereinafter, also referred simply to as a "light emitting state") in which the laser beam LL1 is emitted from the light source unit 3 is aligned along the vertical direction, compared to a case where the adjustment of the swing angle (hereinafter, also referred simply to as a "swing angle of the movable plate 411a") from the rotation center axis J1 of the movable plate 411a as the center (adjustment using an adjustment unit) is not performed. Particularly, it is preferable that the swing angle of the movable plate 411a is configured to be adjusted such that the swing width of the laser beam LL1 is constant along the vertical direction in the light emitting state. Accordingly, the trapezoidal deformation of the image can be prevented whilst maintaining a high time aperture ratio. In this embodiment, representatively, a case where the swing width is adjusted to be constant along the vertical direction will be described.

In addition, the above-described swing width is a distance (gap) in the horizontal direction, in the light emitting state, between the position of the laser beam LL1 on the same plane as the drawing area S11 when the movable plate 411a rotates in the clockwise direction (a predetermined direction) to a maximum angle and the position of the laser beam LL1 on the same plane as the drawing area S11 when the movable plate 411a is subsequently rotated in the counterclockwise direction (a direction opposite to the above-described direction) to a maximum angle, that is, as shown in FIGS. 6A and 6B, a length of each of a plurality of drawing lines (scanning lines) L in the horizontal direction that is a locus of the laser beam LL1 on the drawing area S11 when the laser beam LL1 two-dimensionally scans on the drawing area S11 in the light emitting state.

As shown in FIG. 7, the plurality of drawing lines L is disposed in a zigzag pattern. In the left-side end portion and the right-side end portion of the drawing lines L, the angular velocity (speed) of the light reflecting portion 411e of the optical scanner 41 is low. Thus, the left-side end portion and the right-side end portion are not appropriate for drawing. Accordingly, the drawing area S11 that is an area in which an image is drawn (displayed) is set by excluding the left-end portion and the right-end portion. In addition, the drawing area S11, for example, is set so as to form a rectangular shape (including a square shape).

In a case where the swing angle of the movable plate 411a of the optical scanner 41 is constant, the swing width of the laser beam LL1 in the light emitting state changes in accordance with the angle of the movable plate 421a of the optical scanner 42, and the swing width of the laser beam LL1 becomes longer as the position in the vertical direction (the position of the drawing line L in the vertical direction) in which the laser beam LL1 scans on the drawing area S11 is located farther from the raster scanning module 2. Thus, the raster scanning module 2 adjusts the swing angle of the movable plate 411a in accordance with the angle of the movable plate 421a. In other words, by decreasing the swing angle of the movable plate 411a as the position (the position of the drawing line L in the vertical direction) in which the laser beam LL1 scans on the drawing area S11 becomes farther from the raster scanning module 2, the swing width of the laser beam LL1 in the light emitting state becomes constant along the vertical direction.

In the calibration curve memory section 57, a calibration curve such as a table or a calculation equation (function) that represents the relationship between the position of the laser beam LL1 in the vertical direction (the position of the drawing line L in the vertical direction) on the drawing area S11 in which the laser beam LL1 scans the drawing area S11 and the swing angle of the movable plate 411a in which the swing width of the laser beam LL1 is constant along the vertical direction in the light emitting state is stored in memory (stored). When an image is to be drawn, the swing angle (target swing angle) is acquired based on the position of the laser beam LL1, which scans the drawing area S11, in the vertical direction on the drawing area S11 by using the calibration curve. The calibration curve can be acquired based on a calculation process, and is stored in the calibration curve memory section 57 in advance.

In this raster scanning module 2, it is preferable that the angle and the angular velocity of the movable plate 421a are adjusted in the drawing area S11 such that a gap between adjacent drawing lines L, which are odd drawing lines L from the upper side, in the vertical direction is constant, and similarly, a gap between adjacent drawing lines L, which are even drawing lines L from the upper side, in the vertical direction is constant. Accordingly, deformation of an image in the vertical direction can be prevented.

In this embodiment, for example, in the left-side end portion and the right-side end portion of the drawing area S11 when drawing of the drawing lines L is started, the angle of the movable plate 421a is adjusted such that the gap between adjacent drawing lines L in the vertical direction is constant, and the angular velocity of the movable plate 421a is set to a predetermined value. In other words, the angle of the movable plate 421a is adjusted such that the gap between adjacent drawing start points of the drawing lines L in the vertical direction is constant, and the angular velocity of the movable plate 421a is set to a predetermined value for each drawing line L. In addition, as the position of the drawing line L in the vertical direction is located farther from the raster scanning module 2, the angular velocity of the movable plate 421a is set to be smaller. Accordingly, deformation of an image in the vertical direction can be prevented by performing relatively simple control.

Next, the operation of the raster scanning module 2 when an image is drawn on the drawing area S11 of the screen S will be described.

First, video data is input to the raster scanning module 2. The input video data is temporarily stored in the video data memory section 51 and is read out from the video data memory section 51, and drawing an image is performed by using the video data. In such a case, the drawing of an image may be started after all the video data is stored in the video data memory section 51. Alternatively, it may be configured that the drawing of an image is started after a part of the video data is stored in the video data memory section 51, and then continuing video data is stored in the video data memory section 51 in parallel with the drawing of the image.

In a case where the drawing of an image is started after apart of the video data is stored in the video data memory section 51, first, video data corresponding to at least one frame, preferably video data corresponding to two or more frames (for example, two frames) is stored in the video data memory section 51, and thereafter, the drawing of the image is started. The reason for this is as follows. In this raster scanning module, an image is drawn by performing horizontal scanning in the forward path and the return path of the vertical scanning (hereinafter, also referred simply to as "reciprocating drawing in the vertical direction"), and the orders of reading out the video data from the video data memory section 51 at the time of drawing the image in the forward path of the vertical scanning and at the time of drawing the image in the return path of the vertical direction are opposite to each other, as will be described later. Accordingly, in order to read out the video data from the opposite side when the drawing of an image in the return path of the vertical scanning is started, video data corresponding to at least one frame used for the drawing of the image in the return path needs to be stored in the video data memory section 51.

The drawing timing generating section 53 generates drawing timing information and drawing line information. The drawing timing information is transmitted to the video data calculating section 52, and the drawing line information is transmitted to the swing angle calculating section 55.

In the drawing timing information, information on the timing for performing drawing and the like are included. In addition, in the drawing line information, information on the position of a drawing line L in the vertical direction (the angle of the movable plate 421a) for which drawing is performed and the like are included. The position of any portion of a drawing line L may be set as the position of the above-described drawing line L in the vertical direction. For example, the left-side front end, the right-side front end, the center, or the like may be set as the position of the drawing line L in the vertical direction.

The video data calculating section 52 reads out video data corresponding to a pixel to be drawn from the video data memory section 51 based on the drawing timing information input from the drawing timing generating section 53, performs various correction operations for the video data, and transmits luminance data of each color to the light source modulating section 54.

The light source modulating section 54 modulates the light sources 320r, 320g, and 320b through driving circuits 310r, 310g, and 310b based on the luminance data of each color that is input from the video data calculating section 52. In other words, the light source modulating section 54 turns on/off the light sources 320r, 320g, and 320b and adjusts (increases/decreases) the outputs thereof.

The angle detecting section 43 located on the optical scanner 41 side detects the angle and the swing angle of the movable plate 411a and transmits information on the angle and the swing angle (angle information of the movable plate 411a) to the drawing timing generating section 53 and the swing angle calculating section 55. In addition, the angle detecting section 44 located on the optical scanner 42 side detects the angle of the movable plate 421a and transmits information on the angle (angle information on the movable plate 421a) to the angle directing section 56.

When the drawing of the current drawing line L is completed, and the information on the swing angle of the movable plate 411a is input from the angle detecting section 43, the drawing timing generating section 53 transmits the target angle information (an angle direction) representing the target angle of the movable plate 421a when the laser beam LL1 is irradiated onto the drawing start point of the next drawing line L for which drawing is performed to the angle directing section 56 in synchronization with the input of the information on the swing angle of the movable plate 411a. The target angle of the movable plate 421a is set such that the gap between the adjacent drawing start points in the vertical direction is constant. The angle directing section 56 compares the angle of the movable plate 421a that is detected by the angle detecting section 44 and the target angle of the movable plate 421a and performs correction so as to allow the difference thereof to be zero, and transmits driving data to a driving section 427 of the optical scanner 42.

The driving section 427 drives the optical scanner 42 based on the driving data (applies a voltage to the coil). Accordingly, when the laser beam LL1 is irradiated onto the the drawing start point, the angle of the movable plate 421a becomes the above-described target angle.

In addition, in this embodiment, it may be configured that, from the drawing start point to the drawing end point of each drawing line L, the angular velocity of the movable plate 421a is constant, and the scanning speed of the laser beam LL1 in the vertical direction is constant. Alternatively, the scanning speed of the laser beam LL1 in the vertical direction may be slowly changed by slowly changing the angular velocity of the movable plate 421a.

In addition, the drawing timing generating section transmits the drawing line information, that is, the information on the position of the next drawing line L, for which drawing is performed, in the vertical direction to the swing angle calculating section 55.

The swing angle calculating section 55 acquires the target swing angle of the movable plate 411a for the next drawing line L for which drawing is performed based on the information on the position of the next drawing line L, for which drawing is performed, in the vertical direction that is input from the drawing timing generating section 53 by using the calibration curve read out from the calibration curve memory section 57. Then, the swing angle calculating section 55 transmits the driving data to the driving section 417 of the optical scanner 41 such that the swing angle of the movable plate 411a becomes the target swing angle based on the information on the swing angle of the movable plate 411a that is input from the angle detecting section 43 and the target swing angle of the movable plate 411a.

The driving section 417 changes the magnitude of an effective current or a phase difference between the optical scanner 41 and the driving waveform by allowing a current to flow through the coil 415 by applying an effective voltage having the same frequency as the resonant frequency of the optical scanner 41 to the coil 415 based on the driving data so as to generate a predetermined magnetic field, whereby supplying energy to the optical scanner 41 or adversely taking power out of the optical scanner 41. Accordingly, the swing angle of the movable plate 411a that is in resonance becomes the target swing angle. As described above, the laser beam LL1 sequentially scans each drawing line L of the drawing area S11 so as to draw an image whilst adjusting the swing angle of the movable plate 411a such that the swing angle of the movable plate 411a becomes the target swing angle based on the information on the swing angle (detection result) of the movable plate 411a that is detected by the angle detecting section 43 and the above-described target swing angle (target value).

In addition, the drawing timing generating section 53 is managed in order to determine whether a frame for which drawing is performed is an odd frame or an even frame and determines the rotation direction (movement direction) of the movable plate 421a and the order in reading out the video data from the video data memory section 51 based on the result of the management. In other words, the orders in reading out the video data are opposite to each other at the time of drawing an image for an odd frame (the forward path of the scanning in the vertical direction) and at the time of drawing an image for an even frame (the return path of the scanning in the vertical direction).

In addition, in the odd frame and the even frame, the laser beam LL1 scans the same line in the drawing area S11. In other words, the laser beam LL1 scans such that each drawing line L of odd frames and each drawing line L of even frames coincide with each other.

In particular, for example, as shown in FIGS. 6A and 6B, for the first frame (odd frame), drawing is started from the upper left side and drawing is performed up to the lower right side in a zigzag pattern. For the second frame (even frame), the rotation direction of the movable plate 421a is set to be opposite to the above-described direction, and drawing is performed from the lower right side to the upper left side, which is opposite to the above-described direction. Thereafter, similarly, drawing is performed from the upper left side to the lower right side for an odd frame, and drawing is performed from the lower right side to the upper left side for an even frame.

In this embodiment, the forward path of the scanning in the vertical direction is for an odd frame, and a return path of the scanning in the vertical direction is for an even frame. However, the invention is not limited thereto. Thus, it may be configured that the return path of the scanning in the vertical direction is for an odd frame, and the forward path of the scanning in the vertical direction is for an even frame.

In addition, in this embodiment, the position in which drawing is started for the first frame is on the upper left side. However, the invention is not limited thereto. Thus, for example, the position in which drawing is started may be on the upper right side, the lower left side, the lower right side, or the like.

In addition, in the odd frame and the even frame, the laser beam LL1 may scan different lines in the drawing area S11.

Here, when an image is drawn as described above, the temporal change in the swing angle of the movable plate 411a and the temporal change in the swing angle of the movable plate 421a are as follows.

In the horizontal scanning, as represented in FIG. 7, the swing angle of the movable plate 411a slowly increases from the minimum swing angle, then slowly decreases after arriving at the maximum swing angle, and slowly increases after arriving at the minimum swing angle. Thereafter, similarly, the above-described operations are repeated. As described above, in the raster scanning module 2, the swing angle of the movable plate 411a does not abruptly change. Accordingly, the swing angle of the movable plate 411a of the optical scanner 41 that is a type operated by using resonance can be adjusted easily and reliably.

In the vertical scanning, as represented in FIG. 8, the swing angle of the movable plate 421a slowly increases from the minimum swing angle, then slowly decreases after arriving at the maximum swing angle, and slowly increases after arriving at the minimum swing angle. Thereafter, similarly, the above-described operations are repeated. As described above, in the raster scanning module 2, the swing angle of the movable plate 421a does not abruptly change. Accordingly, the swing angle of the movable plate 421a of the optical scanner 42 can be adjusted easily and reliably. In addition, between a display period (drawing period) during which drawing an image is performed for an odd frame (the forward path of the scanning in the vertical direction) and a display period during which drawing an image is performed for an even frame (the return path of the scanning in the vertical direction), a non-display period (non-drawing period) during which drawing an image is not performed is arranged. During this display period, each timing such as a timing for starting to draw an image for the next frame can be adjusted.

In addition, an image is drawn in the forward path and the return path of the scanning in the vertical direction, that is, at both the time of rotating the movable plate 421a in a predetermined direction and the time of rotating the movable plate 421a in the direction opposite to the predetermined direction. Accordingly, a vertical blanking interval as in a general case is not necessary, and thus the non-display period can be shortened. Therefore, a time aperture ratio (a fraction of the period during which an image is drawn) can be increased.

In other words, the non-display period in the vertical direction of one frame can be shortened by performing reciprocating drawing, and accordingly, the vertical time aperture ratio is increased. Thus, when the angular velocity (speed) of the movable plate 411a is the same as that of a case where an image is drawn by performing the horizontal scanning only in a forward path of the vertical scanning, the number of frames (the number of frames) per unit time can be increased, compared to the case where an image is drawn only in the forward path. Accordingly, quick movement in a moving image can be responded to in an easy manner. In other words, when the number of frames per unit time is the same as that of the case where an image is drawn by performing horizontal scanning only in the forward path of the vertical scanning, the angular velocity of the movable plate 411a can be decreased, compared to the case where an image is drawn only in the forward path. Therefore, an image can be drawn in a stable manner. In the above-described case, when the angular velocity of the movable plate 411a is not changed, drawing can be performed with higher vertical resolution.

Here, in fact, there is a case where, for example, the inertia (inertial moment) of the movable plates 411a and 421a of the optical scanners 41 and 42 is high, and the movable plates 411a and 421a do not instantly follow the image. In such a case, for example, there is a case where the driving current of the optical scanners 41 and 42 is set to zero or the optical scanners 41 and 42 are driven in a reverse phase (braking).

As described above, according to this raster scanning module 2, the trapezoidal deformation of a raster image can be prevented by the deformation correcting unit 5 without abruptly changing the swing angles of the movable plates 411a and 421a whilst maintaining a high time aperture ratio.

In addition, an image is drawn by performing horizontal scanning in the forward path and the return path of the vertical scanning. Accordingly, when the forward path is switched to the return path or the return path is switched to the forward path in the vertical scanning, the swing angle of the movable plate 421a does not need to be abruptly changed. Therefore, the swing angle of the movable plate 421a can be adjusted easily and reliably.

Next, a modified example will be described with reference to FIGS. 9A and 9B.

In a raster scanning module 2 represented in FIGS. 9A and 9B, the swing angle of the movable plate 411a is configured to be adjusted such that the swing width of the laser beam LL1 in the light emitting state is not constant along the vertical direction but the swing width of the laser beam LL1 in the light emitting state is aligned along the vertical direction, compared to a case where the swing angle of the movable plate 411a is not adjusted. Accordingly, the width of the upper side of a drawable area S12 in which an image can be drawn is decreased, and the shape of the drawable area S12 is close to a rectangle (including a square). Therefore, a non-drawing area can be decreased.

This raster scanning module 2 sets a rectangular drawing area S11 on a display surface S1, that is, within the drawable area S12, and the driving of the light source unit 3 is controlled such that the laser beam LL1 emitted from the light source unit 3 is projected (irradiated) within the drawing area S11. Accordingly, the trapezoidal deformation of an image can be prevented.

Hereinafter, a vector scanning module 6 will be described.

As shown in FIG. 10, the vector scanning module 6 includes: a light source unit (light emitting section) 7 that emits a laser beam (luminous fluxes); a light scanning unit 8 that scans (irradiates) the beam emitted from the light source unit 3 for the drawing area S11; and an operation control device 9 that controls the operations of the light source unit 7 and the light scanning unit 8. By employing such a configuration, the vector scanning module 6 can be configured in a relatively simple manner.

The light source unit 7 includes laser beam sources 71r, 71g, and 71b of each color, and collimator lenses 72r, 72g, and 72b and dichroic mirrors 73r, 73g, and 73b that are arranged in correspondence with the laser beam sources 71r, 71g, and 71b of each color. The light source unit 7 has the same configuration as that of the light source unit 3 included in the raster scanning module 2. Thus, a detailed description thereof is omitted.

The light scanning unit 8 scans (irradiates) the laser beam LL2 emitted from the light source unit 7 for the drawing area S11 so as to form a segment connecting two different points on the drawing area S11. The "segment" described here includes a segment having a linear shape and a segment having a substantially linear shape, that is, a segment that is slightly curved.

This light scanning unit 8 includes: an optical scanner 81 that can scan the laser beam LL2 emitted from the light source unit 7 for the drawing area S11 in the horizontal direction (x direction); an angle detecting section 83 that detects the angle (behavior) of the movable plate 811a of the optical scanner

81; an optical scanner 82 that can scan the laser beam LL2 emitted from the light source unit 7 for the drawing area S11 in the vertical direction (y direction); and an angle detecting section 84 that detects the angle (behavior) of the movable plate 821a (light reflecting unit 811e) of the optical scanner 82.

The optical scanners 81 and 82 have the same configuration as that of the optical scanners 41 and 42 included in the raster scanning module 2. Thus, a detailed description thereof is omitted. In addition, the configuration of the angle detecting sections 83 and 84 have the same configuration as that of the angle detecting sections 43 and 44 included in the raster scanning module 2. Thus, a detained description thereof is omitted.

As shown in FIG. 10, the optical scanners 81 and 82 having the above-described configuration are arranged so as to have rotation center axes J3 and J4 that are perpendicular to each other. By arranging the optical scanners 81 and 82 as described above, the laser beam LL2 emitted from the light source unit 7 can be scanned in two dimensions in the drawing area S11. Accordingly, a two-dimensional image (vector image) can be drawn in the drawing area S11 by employing a relatively simple configuration.

Described in detail, the laser beam LL2 emitted from the light source unit 7 is reflected from the reflective face of the light reflecting portion 411e of the optical scanner 81, then is reflected from the reflective face of the light reflecting portion 821e of the optical scanner 82, and then is projected to the drawing area S11 of the screen S. At this time, when the movable plate 811a of the optical scanner 81 and the movable plate 821a of the optical scanner 82 are maintained to have a respective swing angle, the laser beam LL2 can be irradiated onto one point located on the drawing area S11 (in other words, a point can be drawn in the drawing area S11). In addition, when only the movable plate 811a rotates, a laser beam LL2 can be irradiated in the horizontal direction (x direction) and a straight line (segment) extending in the horizontal direction can be drawn. Similarly, when only the movable plate 821a rotates, a laser beam LL2 can be irradiated in the vertical direction (y direction) and a straight line (segment) extending in the vertical direction can be drawn. In addition, by rotating the movable plates 811a and 821a together, the laser beam LL2 can scan in a direction (this direction is also referred to as an "xy composition direction") tilted with respect to the horizontal direction and the vertical direction, and a straight line (segment) extending in that direction can be drawn. In addition, by controlling the angular velocities of the movable plates 811a and 821a, the tilt of the xy composition direction with respect to the y direction (or the x direction) can be adjusted in a simple manner.

The above-described light scanning unit 8 can draw an image forming a desired shape on the drawing area S11 in a traversable manner by sequentially connecting a plurality of segments, which are formed as described above, extending in every directions. In addition, as the length of the segment is shorter, corner edges of connection portions (joint portions) of the segments are less visible when viewed macroscopically, and accordingly, a clearer (natural) image can be drawn.

Here, in the vector scanning module 6, differently from the raster scanning module 2, it is preferable that both the optical scanners 81 and 82 are driven in a non-resonance manner. Accordingly, the swing angles of the movable plates 811a and 821a of the optical scanners 81 and 82 can be maintained at desired angles, or the angular velocities of the movable plates 811a and 821a can be set to desired velocities, in a simple manner. Therefore, the above-described image (an image formed by a set of segments) can be drawn more precisely. In addition, a drawing time (a time required for drawing) of one (one frame) vector image drawn by the vector scanning module 6 may be longer than that of one (one frame) raster image drawn by the raster scanning module 2. Accordingly, even when the angular velocities of the movable plates 811a and 821a are slow, there is no possibility that a problem such as deterioration of the image quality occurs.

Next, the operation control device 9 will be described.

As shown in FIG. 11, the operation control device 9 includes: a video data memory section (video data memory unit) 91 that stores video data (image data) used when an image is drawn; a video data calculating section 92; a drawing timing generating section 93; a light source modulating section (optical modulating unit) 94; an angle directing section 96; and a calibration curve memory section (calibration curve memory unit) 97 that stores a calibration curve.

In the coordinate memory section 97, information (hereinafter, also referred to as "coordinate data") such as a table representing a combination of coordinates (xy coordinates) of each point (for example, Q1, Q2, and Q3 shown in FIG. 10) positioned in the drawing area S11 and the swing angles of the movable plates 811a and 821a for irradiating the laser beam LL2 onto each point or a calculation equation (function) is stored. When a vector image is drawn, a laser beam is irradiated (scanned) onto the drawing area S11 by using the above-described information.

Next, the operation of the vector scanning module 6 when a vector image is drawn on the drawing area S11 of the screen S will be described.

First, video data is input to the vector scanning module 6. The input video data is temporarily stored in the video data memory section 91 and is read out from the video data memory section 91, and drawing an image is performed by using the video data. As the input video data, for example, there are coordinates of start points and end point of all the straight lines (segments) forming an image of one frame and color information (luminance data) of each line. As described above, the amount of information required for performing vector scanning is smaller than that for performing raster scanning. Accordingly, the vector scanning module 6 can be driven with a relatively small memory.

In such a case, the drawing of an image may be started after all the video data is stored in the video data memory section 91. Alternatively, it may be configured that the drawing of an image is started after a part of the video data is stored in the video data memory section 91, and then continuing video data is stored in the video data memory section 91 in parallel with the drawing of the image.

The drawing timing generating section 93 generates drawing timing information and drawing line information. The drawing timing information is transmitted to the video data calculating section 92, and the drawing line information is transmitted to the angle directing section 96.

In the drawing timing information, information on the timing for performing drawing and the like are included. In addition, in the drawing line information, information on the coordinates of the start points and the end points of the segments forming a vector image of one frame is included.

The video data calculating section 92 reads out video data corresponding to the point, which is positioned on the drawing area S11, to be drawn from the video data memory section 91 based on the drawing timing information input from the drawing timing generating section 93, performs various correction operations for the video data, and transmits luminance data of each color to the light source modulating section 94.

The light source modulating section 94 modulates the light sources 720r, 720g, and 720b through driving circuits 710r, 710g, and 710b based on the luminance data of each color that is input from the video data calculating section 92. In other words, the light source modulating section 94 turns on/off the light sources 720r, 720g, and 720b and adjusts (increases/decreases) the outputs thereof.

The angle detecting section 83 located on the optical scanner 81 side detects the angle and the swing angle of the movable plate 811a and transmits information on the angle and the swing angle (angle information of the movable plate 811a) to the angle directing section 96. In addition, the angle detecting section 84 located on the optical scanner 82 side detects the angle of the movable plate 821a and transmits information on the angle to the angle directing section 96.

The drawing timing generating section 93 transmits target angle information (an angle direction) representing the target angles of the movable plates 811a and 821a when the laser beam is irradiated onto both the coordinates of the start point and the end point of each segment forming vector drawing, which will be drawn next, to the angle directing section 96 in the order of drawing by using the coordinate data stored in the coordinate memory section 97, in synchronization with the driving timing of the raster scanning module. For example, in a case where an image having a triangle shape as shown in FIG. 12 is desired to be drawn, the drawing timing generating section 93 transmits the coordinate data of a point Q11, which is a start point of a segment LS1 to be drawn first and the coordinate data of a point Q12 that is an end point thereof. Next, the drawing timing generating section 93 transmits the coordinate data of a point Q12 that is a start point of a segment LS2 to be drawn second and the coordinate data of an end point Q13 thereof. Next, the drawing timing generating section 93 transmits the coordinate data of a point Q13 that is a start point of a segment LS3 to be drawn finally and the coordinate data of a point Q11 that is an end point thereof.

The angle directing section 96 compares the angles of the movable plates 811a and 821a that are detected by the angle detecting sections 83 and 84 and the target angles of the movable plates 811a and 821a and performs correction so as to allow the difference thereof to be zero, and transmits driving data to driving sections 817 and 827 of the optical scanners 81 and 82.

The driving sections 817 and 827 drive the optical scanners 81 and 82 based on the driving data. When described in detail for the example represented in FIG. 12, first, the optical scanners 81 and 82 are driven such that the laser beam LL2 linearly connects a start point Q11 and an end point Q12. Accordingly, a segment LS1 is drawn. Next, the optical scanners 81 and 82 are driven such that the laser beam LL2 linearly connects the start point Q12 and an end point Q13. Accordingly, a segment LS2 is drawn. Finally, the optical scanners 81 and 82 are driven such that the laser beam LL2 linearly connects the start point Q13 and the end point Q11. Accordingly, a segment LS3 is drawn. As described above, a vector image of one frame is drawn.

As presented above, the configuration of the optical scanning projector 1 has been described in detail. It is preferable that the raster scanning module 2 and the vector scanning module 6 that configure the optical scanning projector 1, as shown in FIG. 1, are arranged inside a casing 11. Accordingly, the raster scanning module 2 and the vector scanning module 6 can be arranged so as to be close to each other (for example, a distance between portions thereof that emit laser beams is within 20 cm). Accordingly, the optical scanning projector 1 can be formed to be compact.

The optical scanning projector 1 displays a desired image in the drawing area S11 by overlapping (superimposing) a raster image formed by the raster scanning module 2 and a vector image formed by the vector scanning module 6 on the drawing area S11. The image displayed as described above is an image distinguished by ability to attract an observer's strong interest and attention. Thus, particularly, in a case where the image is an advertisement such as a commercial or a promotional video, an excellent effect of the advertisement can be demonstrated.

Figure 13:
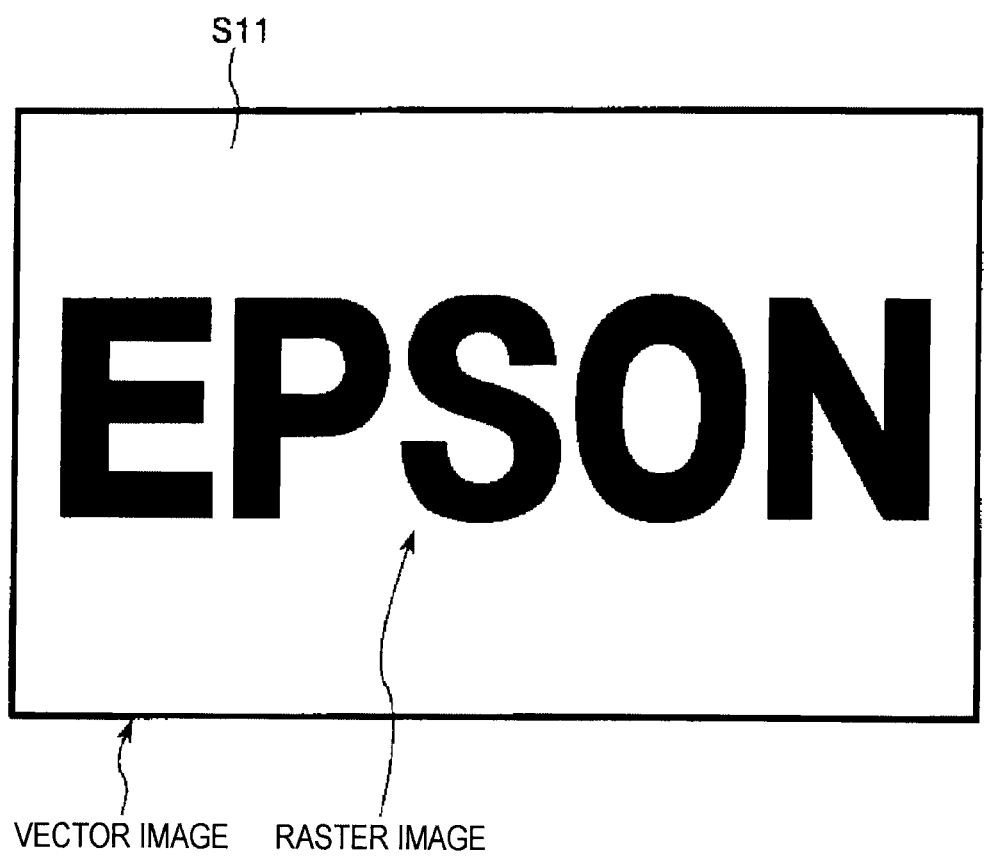
FIG. 13 is a diagram representing an example of an image drawn by the optical scanning projector shown in FIG. 1.

For example, the optical scanning projector 1, as shown in FIG. 13, can draw a raster image in the entirety of the drawing area S11 by using the raster scanning module 2 and can draw an image that represents the contour of the drawing area S11 by using the vector module 6. Accordingly, the raster image displayed within the contour becomes a highlighted image. Therefore, the image (raster image) displayed in the drawing area S11 can attract an observer's attention. Thus, particularly, in a case where the image is an advertisement such as a commercial or a promotional video, excellent effect of the advertisement can be demonstrated.

Figure 14:
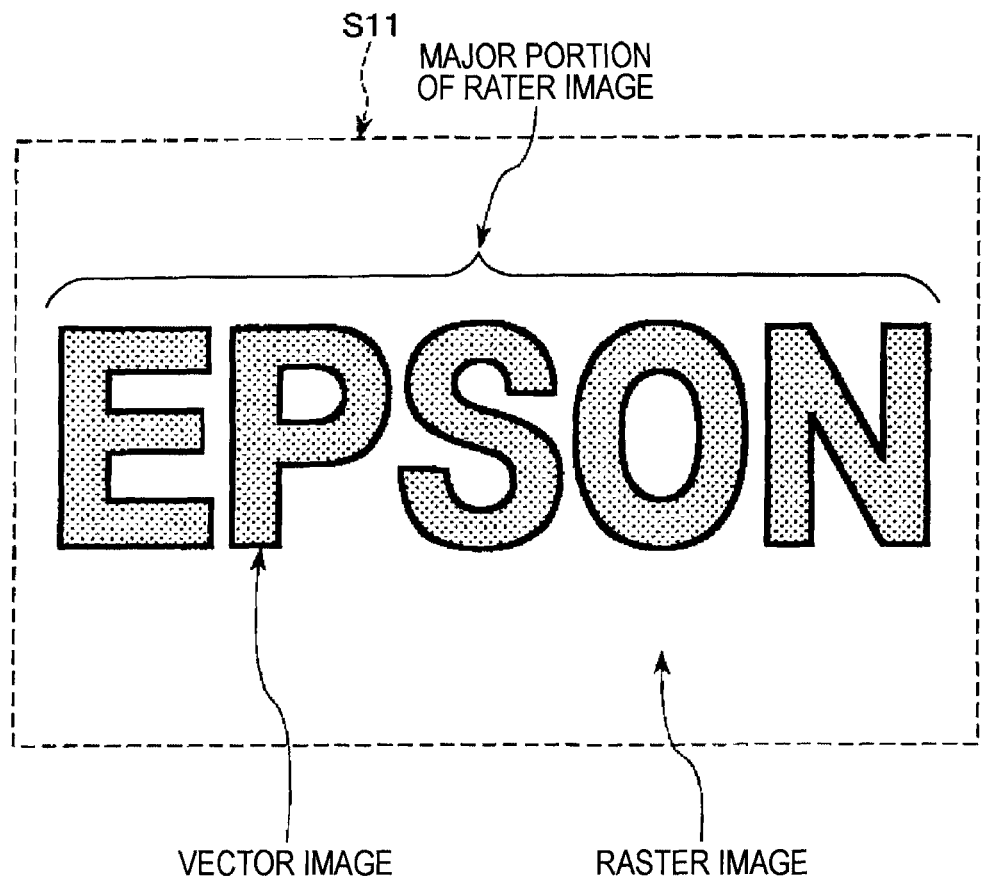
FIG. 14 is a diagram representing an example of an image drawn by the optical scanning projector shown in FIG. 1.

In addition, as shown in FIG. 14, an image that displays the contour of a character group of "EPSON" representing a company name as a major portion of a raster image can be drawn. Accordingly, an image in which the character group of "EPSON" is highlighted is formed. Therefore, even in such a case, the image displayed in the drawing area S11 can attract an observer's attention. Thus, particularly, in a case where the image is an advertisement such as a commercial or a promotional video, excellent effect of the advertisement can be demonstrated. The above-described "major portion of a raster image" other than the company name or the product name as shown in FIG. 14, for example, is a mountain range for the case of a landscape having the mountain range as its main as shown in FIG. 15A, is a figure (for example, a singer, an actor, or the like) for a case where a person is displayed as shown in FIG. 15B, or is a product for the case of a product image as shown in FIG. 15C.

As described above, in a case where an image displaying the contour of a major portion of a raster image is drawn as the vector image, video data in which coordinates (x, y) of each point on the contour of the raster image on the drawing area S11 and color information are associated with each other is stored in the video data memory section 91. A method of generating the image data (the video data of a vector image) is not particularly limited. Thus, for example, the video data of the raster image may be separately generated in correspondence with the video data of the raster image. However, the following generation method is preferably used.

As a method of generating the video data of a vector image, a method in which the data relating to the coordinates and the color of each point on the contour of the major portion of the raster image is recorded in the video data of the raster image, and the video data of the vector image is generated based on the above-described data may be used. In particular, as shown in FIG. 16, an optical scanning projector 1 has a vector image generating unit 100, and the video data of the raster image is transmitted to the vector image generating unit 100. The vector image generating unit 100 generates the video data of the vector image based on the data relating to the coordinates and the color of each point on the contour of the major portion that is included in the received video data of the raster image. Then, the generated video data is stored in the video data memory section 91. According to such a method, the video data of the vector image can be generated based on the video data of the raster image. Accordingly, the video data of the vector image can be generated in a simple manner.

In addition, as a method of generating the video data of a vector image, a method in which the contour of the raster image is detected based on the video data of the raster image, and the video data of the vector image is generated based on the result of the detection may be used. In particular, as shown in FIG. 17, an optical scanning projector 1 has a contour detecting unit 110 and a vector image generating unit 100, and the video data of the raster image is transmitted to the contour detecting unit 110. The contour detecting unit 110 detects the contour of the major portion of the image based on the received video data of the raster image.

A method of detecting the contour is not particularly limited. However, a method in which at least one from among three attributes of a color, that is, hue, chroma, and lightness is used may be used. Preferably, a method in which all the hue, the chroma, and the lightness, that is, chromaticity is used may be used. As described above, based on a difference in the color, the contour can be detected simply and accurately.

In particular, a "chromaticity diagram of the XYZ color coordinate system" that is formed as data is stored in the contour detecting unit 110. Then, the contour detecting unit 110 plots the colors of adjacent pixels included in the video data of the raster image in the chromaticity diagram of the XYZ color coordinate system and detects the boundary of two points as a contour in a case where the two points are separated from each other by a predetermined value of more. Differently from the above-described method, a method in which data (for example, "X: 4832, Y: 3045" or the like), in which the color of each pixel is formed as a value based on the chromaticity diagram of the XYZ color coordinate system, is included in the video data of the raster image, the contour detecting unit 110 acquires a difference (a distance in the chromaticity diagram of the XYZ color coordinate system) in the chromaticities of adjacent pixels based on the data, and the boundary of the pixels is detected as the contour in a case the acquired difference in the chromaticities is equal to or larger than a predetermined value may be used.

The data of the contour detected by the contour detecting unit 110 is transmitted to the vector image generating unit 100, and the video data of the vector image that is generated by the vector image generating unit 100 is stored in the video data memory section 91. By using such a method, the video data of a vector image can be generated simply and reliably.

Figure 18:
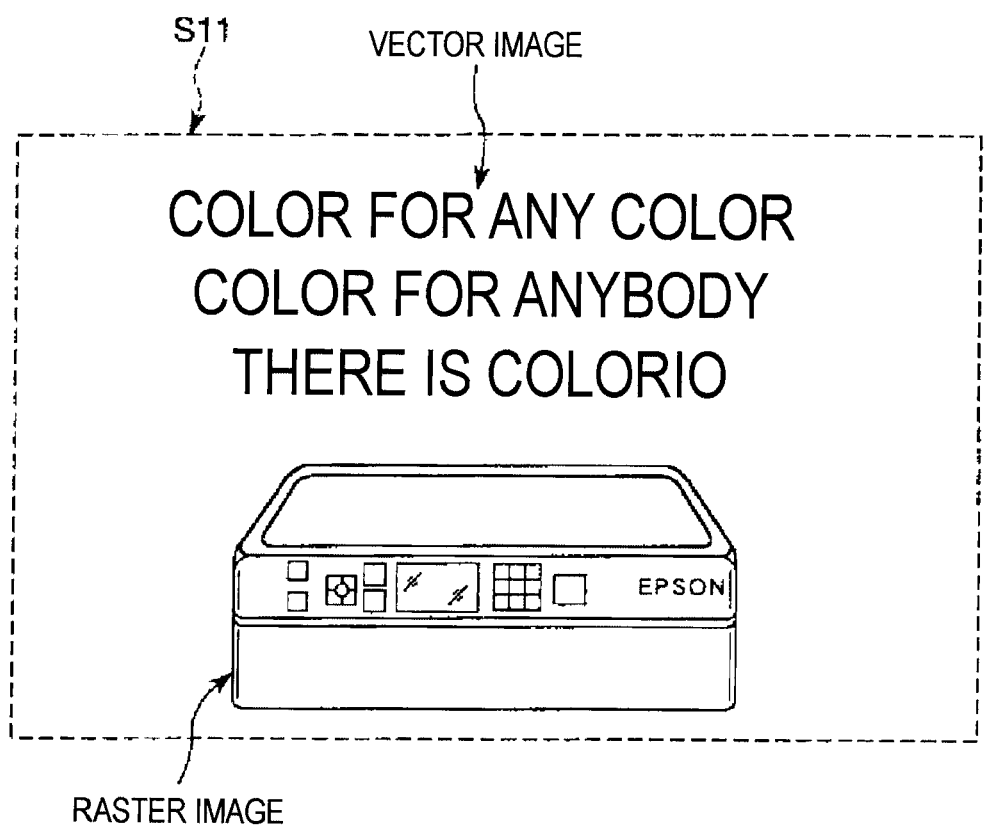
FIG. 18 is a diagram representing an example of an image drawn by the optical scanning projector shown in FIG. 1.

In addition, as shown in FIG. 18, it may be configured that a moving image such as a commercial or a movie is drawn by the raster scanning module 2, and a text image (text information) such as telop or a subtitle is drawn by the vector scanning module 6. Even in such a case, an image that can distinguishably attract an observer's strong attention can be displayed. Thus, particularly, in a case where the image is an advertisement such as a commercial or a promotional video, excellent effect of the advertisement can be demonstrated. In addition, in the text image, elements that have the same function as the text such as a symbol and a number other than the text are included. The text image such as a subtitle or telop maintains the same state for a relatively long time that is a display time (for example, 1/60 seconds) of one frame of a moving image, and is appropriate for drawing using the vector scanning module 6.

As presented above, several examples of an image acquired by overlapping a raster image and a vector image have been described. As described above, such an image is an image that can distinguishably attract an observer's strong interest and attention. Thus, particularly, in a case where the image is an advertisement such as a commercial or a promotional video, excellent effect of the advertisement can be demonstrated. Here, the luminance (brightness) of the vector image, which is drawn by the vector scanning module 6, per unit area is preferably higher than that of the raster image drawn by the raster scanning module 2. Accordingly, the image (the image acquired by overlapping the raster image and the vector image) displayed in the drawing area S11 is an image that can attract an observer's stronger interest and attention more distinguishably. In particular, in a case where the vector image is an image that displays the contour of a major portion of a raster image, the major portion can be more visually distinguishable. Accordingly, in a case where the major portion is an advertisement target (product) or the like, a higher effect of the advertisement can be demonstrated.

The vector scanning module 6 is appropriate for drawing an image having luminance higher than the luminance of the raster image per unit area. In other words, as described above, even when the moving speed (scanning speed) of the laser beam LL2 is relatively low, the vector scanning module 6 does not generate a problem such as deterioration of the image quality of the image displayed in the drawing area S11. Accordingly, the irradiation time of the laser beam LL2 per unit area can be increased by setting the moving speed of the laser beam LL2 to a relatively low speed. Therefore, the luminance per unit area can be set to be higher than that of the raster image in a simple manner.

In addition, an image in which the contour of the drawing area S11 is displayed, an image in which the contour of a major portion is displayed, or an image in which telop or a subtitle is displayed, as described above, can be drawn by any one of the raster scanning module 2 and the vector scanning module 6. However, when the above-described image is to be drawn only by the raster scanning module 2, the laser beam LL1 is scanned at a high speed by the raster scanning module 2. Accordingly, the luminance of the contour portion is lower than an image that is drawn by the optical scanning projector according to the embodiment of the invention. On the other hand, when the above-described image is to be drawn only by the vector scanning module 6, it is difficult for the vector scanning module 6 to scan the laser beam LL2 at a high speed. Accordingly, it is difficult to display a smooth moving image, compared to an image drawn by using the optical scanning projector according to the embodiment of the invention. As described above, one of the raster scanning module 2 and the vector scanning module 6 can only draw an image having the image quality lower than that of an image drawn by using the optical scanning projector according to the embodiment of the invention.

Second Embodiment

Next, an optical scanning projector according to the second embodiment of the invention will be described.

Figure 19:
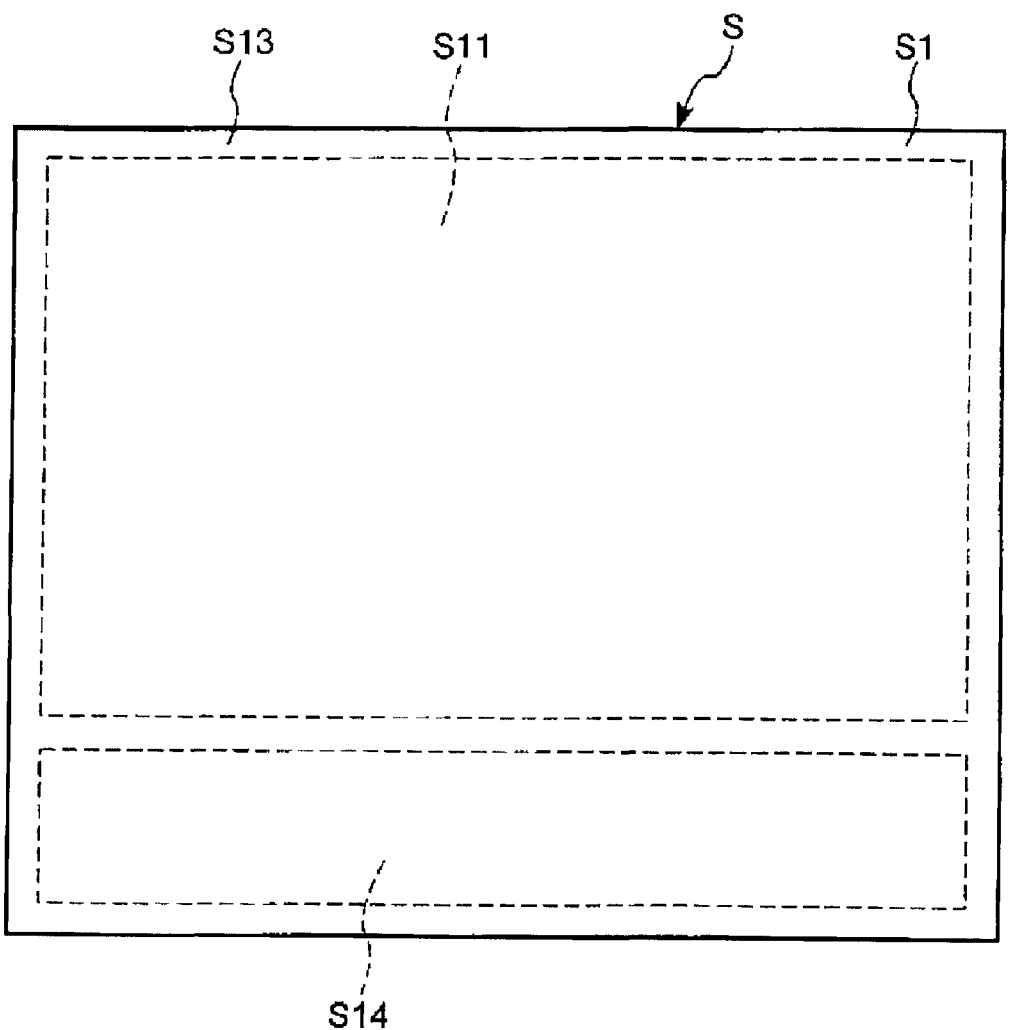
FIG. 19 is a diagram showing an area in which the optical scanning projector according to a second embodiment of the invention draws an image.

FIG. 19 is a diagram showing an area in which the optical scanning projector according to the second embodiment of the invention draws an image. Hereinafter, for convenience of the description, the upper side, the lower side, the right side, and the left side in FIG. 19 will be referred to as "up", "down", "right", and "left".

Hereinafter, the optical scanning projector according to the second embodiment will be described with focusing on a difference between the above-described first embodiment and the second embodiment, and the description of the same configuration will be omitted. In FIG. 19, a same reference sign is assigned to each same configuration as that of the above-described embodiment.

As shown in FIG. 19, on the display surface S1 of the screen S, a drawing area S11 in which a raster image is drawn by the raster scanning module 2 and a vector image is drawn by the vector scanning module 6 and a non-drawing area S13 in which the images are not drawn are formed. In addition, in the non-drawing area S13, a preliminary drawing area S14 in which a vector image can be drawn by the vector scanning module 6 is formed.

On the screen S, the optical scanning projector 1 is configured to display an image acquired by overlapping a raster image and a vector image in the drawing area S11 and to draw a text or the like in the preliminary drawing area S14 by the vector scanning module 6 as is necessary. By employing such a configuration, a moving image or a still image and a text can be drawn in different areas. Accordingly, an image that can be easily recognized by an observer can be displayed on the screen S.

According to the second embodiment, the same advantages as those of the first embodiment can be demonstrated.

Third Embodiment

Next, an optical scanning projector according to the third embodiment of the invention will be described.

Figure 20:
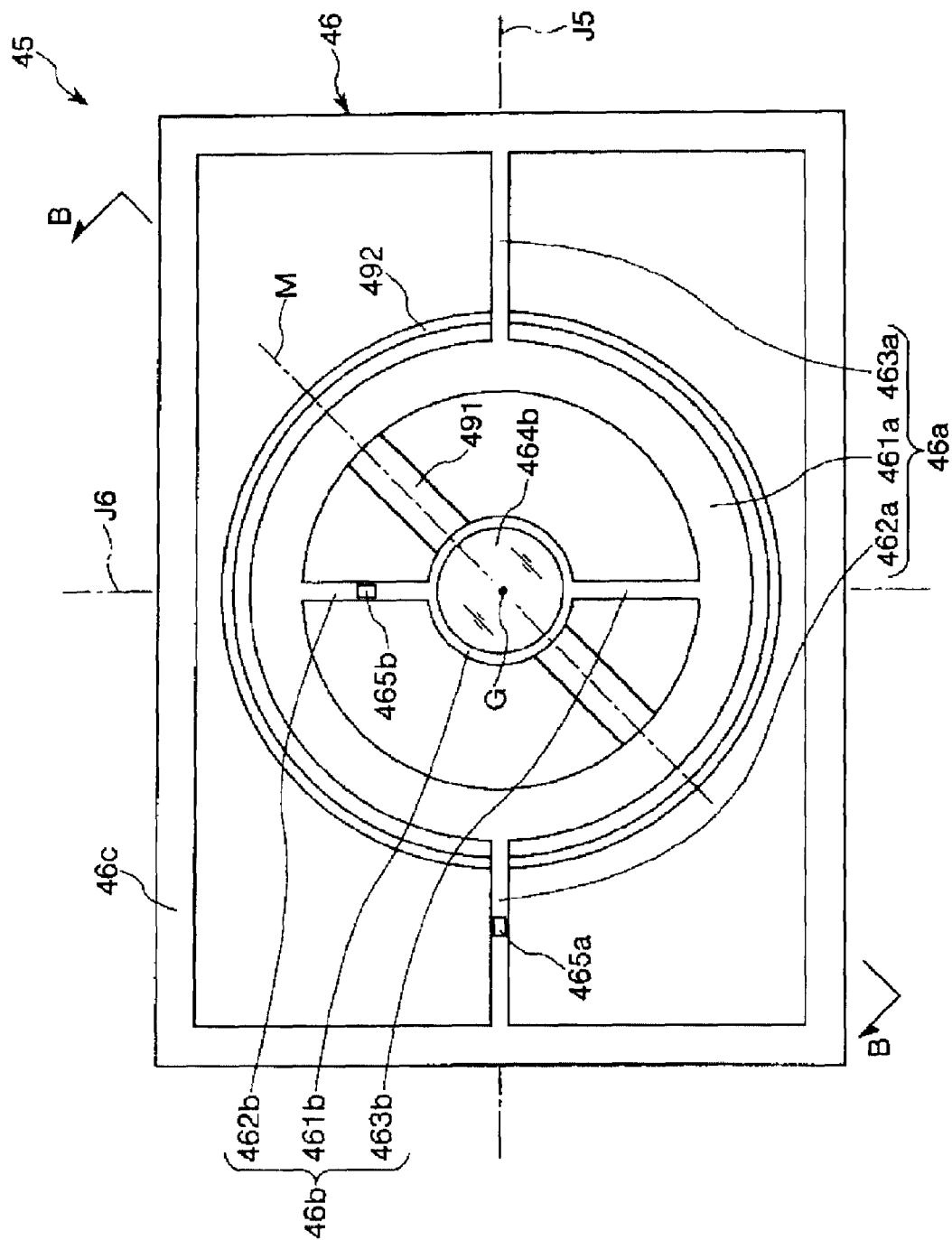
FIG. 20 is a schematic plan view representing an optical scanner included in a raster scanning module that is included in the optical scanning projector according to a third embodiment of the invention.
Figure 21:
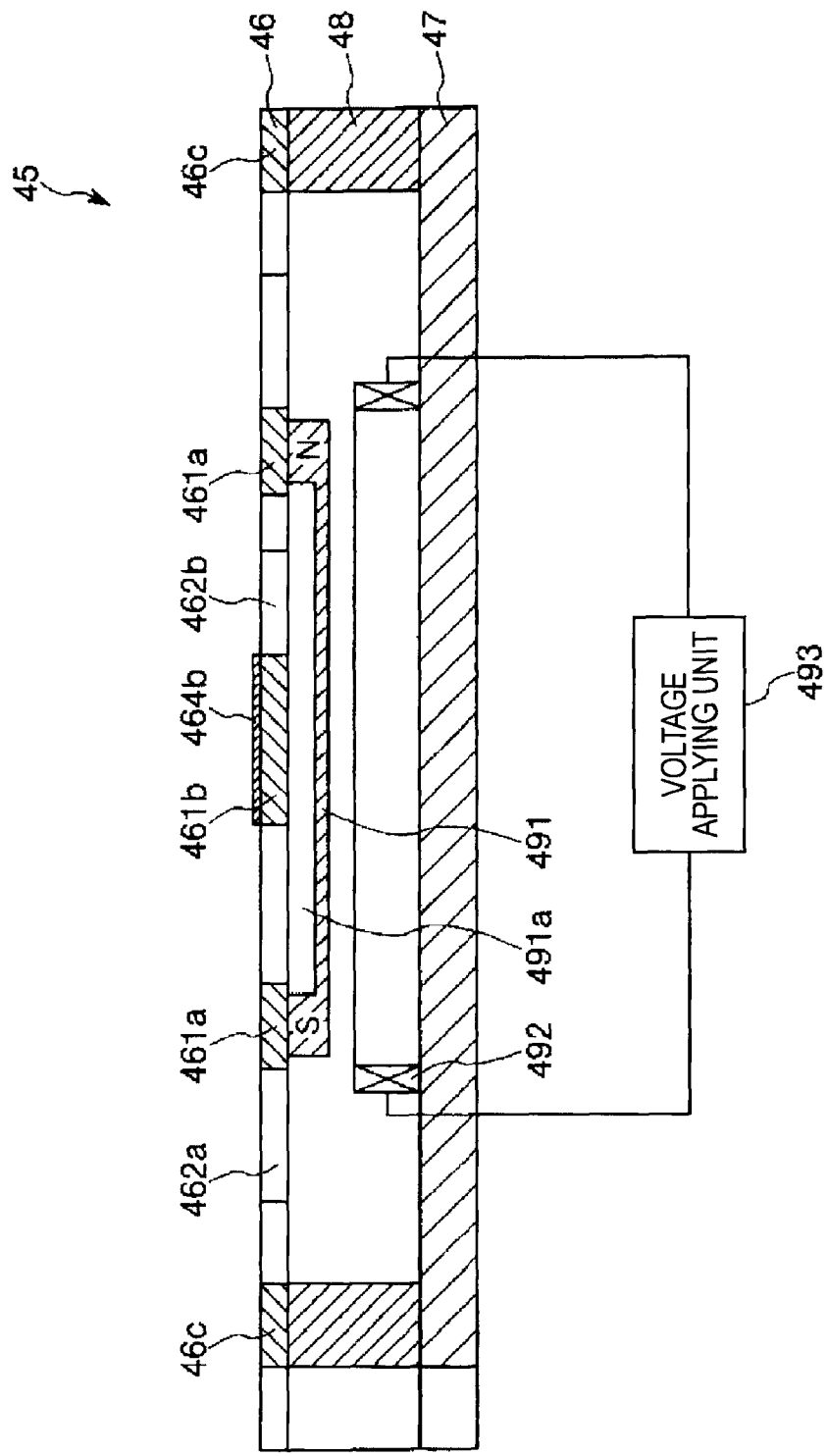
FIG. 21 is a cross-sectional view taken along line B-B shown in FIG. 20.
Figure 22:
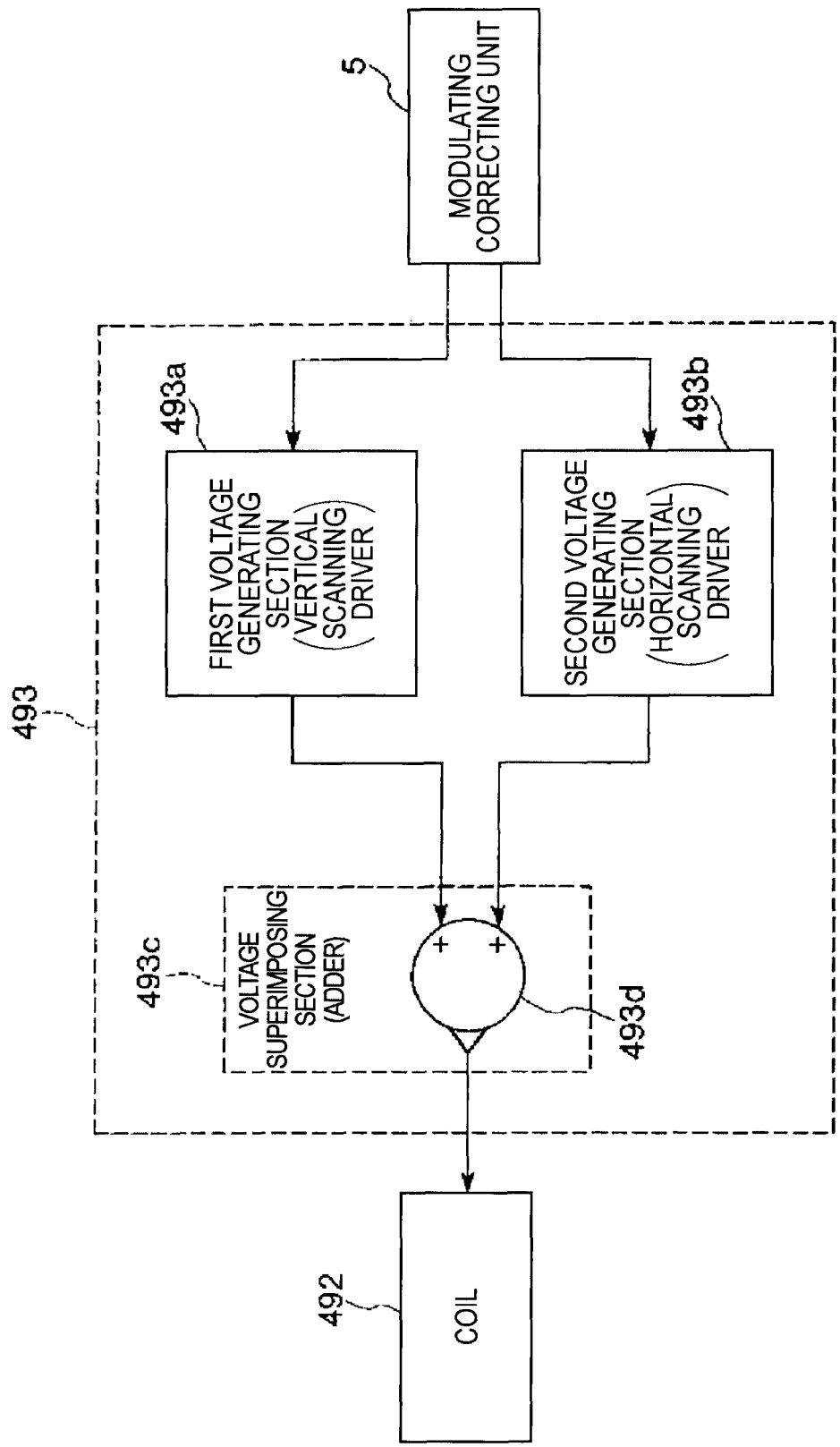
FIG. 22 is a block diagram representing a voltage applying unit of a driving section that is included in the optical scanner shown in FIG. 20.
Figure 23A:
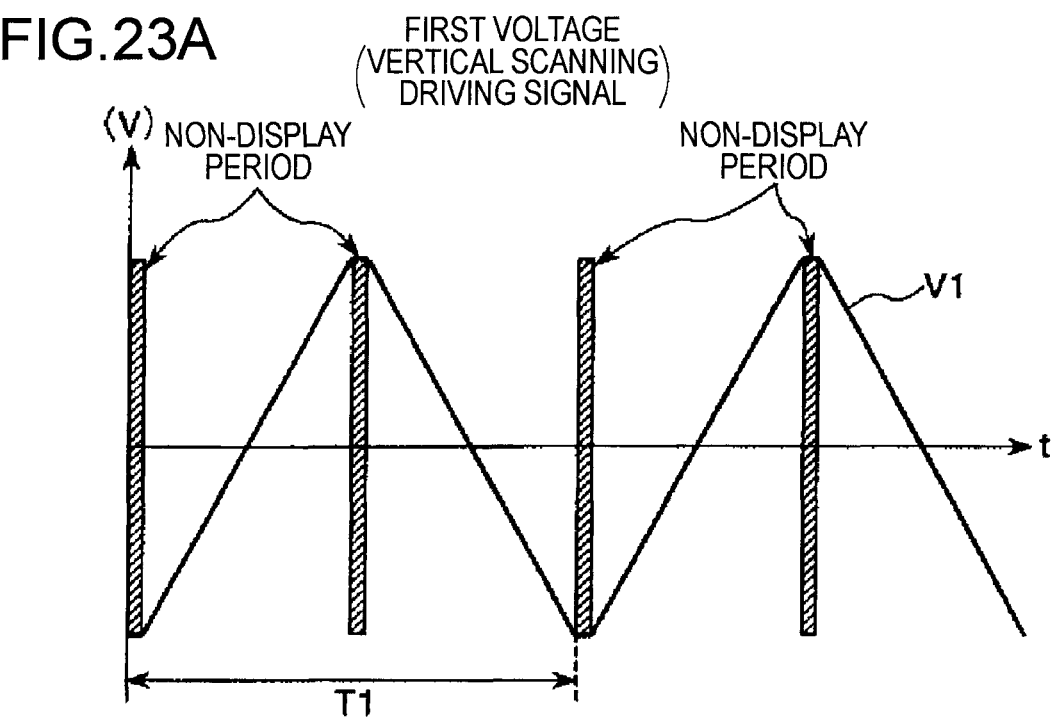
FIGS. 23A and 23B are diagrams representing an example of voltages generated by a first voltage generating unit and a second voltage generating unit shown in FIG. 22.
Figure 23B:
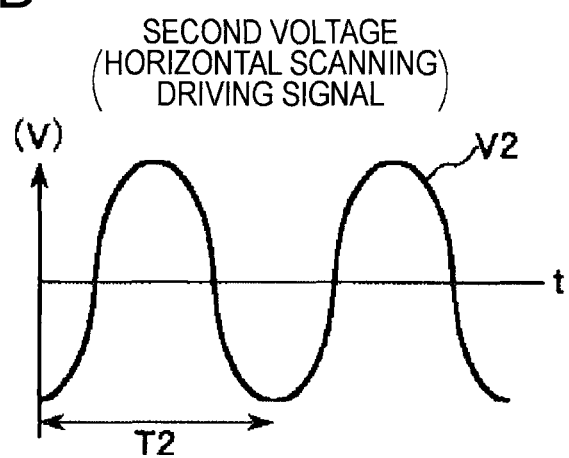

FIG. 20 is a schematic plan view representing an optical scanner included in a raster scanning module that is included in the optical scanning projector according to the third embodiment of the invention. FIG. 21 is a cross-sectional view taken along line B-B shown in FIG. 20. FIG. 22 is a block diagram representing a voltage applying unit of a driving section that is included in the optical scanner shown in FIG. 20. FIGS. 23A and 23B are diagrams representing an example of voltages generated by a first voltage generating unit and a second voltage generating unit shown in FIG. 22. FIGS. 24A and 24B are diagrams (FIG. 24A is a side view, and FIG. 24B is a front view) illustrating the operation of a raster scanning module included in the optical scanning projector according to the third embodiment of the invention. Hereinafter, for convenience of the description, the front side of the sheet face, the inner side of the sheet face, the right side, and the left side in FIG. 20 will be referred to as "up", "down", "right", and "left". In addition, the upper side, the lower side, the right side, and the left side in FIG. 21 will be referred to as "up", "down", "right", and "left".

Hereinafter, the optical scanning projector according to the third embodiment will be described with focusing on a difference between the above-described first embodiment and the third embodiment, and the description of the same configuration will be omitted.

The optical scanning projector according to the third embodiment is almost the same as that according to the first embodiment except for the configurations of the optical scanner included in the raster scanning module and the optical scanner included in the vector scanning module and the shape of the locus of scanning (horizontal scanning) in the x direction on the drawing area S11 in the raster scanning that is not a straight line. In FIGS. 22 and 24, a same reference sign is assigned to each same configuration as that of the above-described embodiment.

The light scanning unit 4 included in the raster scanning module has one optical scanner 45 of a so-called vibration system with two degrees of freedom.

The optical scanner 45 includes: a base body 46 that has a first vibration system 46a, a second vibration system 46b, and a support portion 46c as shown in FIG. 20; an opposing substrate 47 that is disposed so as to face the base body 46; a spacer member 48 that is arranged between the base body 46 and the opposing substrate 47; a permanent magnet 491; and a coil 492.

The first vibration system 46a is configured by a driving section 461a having a frame shape that is arranged on the inner side of the support portion 46c having a frame shape and one pair of first connection portions 462a and 463a that allow the driving section 461a to be supported by the support portion 46c on both sides.

The second vibration system 46b is configured by a movable plate 461b that is arranged on the inner side of the driving section 461a and one pair of second connection portions 462b and 463b that allow the movable plate 461b to be supported by the driving section 461a on both sides.

The driving section 461a forms a circular ring shape in the plan view of FIG. 20. The shape of the driving section 461a is not particularly limited as long as it forms a frame shape. Thus, for example, the driving section 461a may form a rectangular ring shape in the plan view of FIG. 20. To the lower face of the driving section 461a, the permanent magnet 491 is bonded.

The first connection portions 462a and 463a form a longitudinal shape and can be elastically transformed. The first connection portions 462a and 463a connect the driving section 461a and the support portion 46c such that the driving section 461a can rotate with respect to the support portion 46c. The first connection portions 462a and 463a are arranged so as to have the same axis, and the driving section 461a is configured so as to rotate around the axis (hereinafter, referred to as a "rotation center axis J5") with respect to the support portion 46c.

In the first connection portions 462a, a piezoelectric device 465a that is used for detecting the angle (the rotation angle around the rotation center axis J5) (behavior) of the driving section 461a is arranged.

The movable plate 461b forms a circular shape in the plan view of FIG. 20. The shape of the movable plate 461b is not particularly limited, as long as it can be formed on the inner side of the driving section 461a. Thus, for example, the movable plate 461b may form an oval shape or a rectangular shape in the plan view of FIG. 20. On the upper face of the movable plate 461b, a light reflecting portion 464b having light reflectivity is formed.

The second connection portions 462b and 463b form a longitudinal shape and can be elastically transformed. The second connection portions 462b and 463b connect the movable plate 461b and the driving section 461a such that the movable plate 461b can rotate with respect to the driving section 461a. The second connection portions 462b and 463b are arranged so as to have the same axis, and the movable plate 461b is configured so as to rotate around the axis (hereinafter, referred to as a "rotation center axis J6") with respect to the driving section 461a.

In the second connection portion 462b, a piezoelectric device 465b that is used for detecting the angle (the rotation angle around the rotation center axis J6) (behavior) of the movable plate 461b is arranged.

As shown in FIG. 20, the rotation center axis J5 and the rotation center axis J6 are orthogonal to each other. In addition, the centers of the driving section 461a and the movable plate 461b are positioned in an intersection of the rotation center axis J5 and the rotation center axis J6 in the plan view of FIG. 20. Hereinafter, for convenience of the description, the intersection of the rotation center axis J5 and the rotation center axis J6 is also referred to as an "intersection G".

As shown in FIG. 21, the above-described base body 46 is bonded to the opposing substrate 47 through the spacer member 48. On the upper face of the opposing substrate 47, the coil 492 that generates a magnetic field applied to the permanent magnet 491 is arranged.

The permanent magnet 491 is arranged along a segment (this segment is also referred to as a "segment M") that is tilted with respect to the rotation center axis J5 and the rotation center axis J6 by passing the intersection G in the plan view of FIG. 20. One side of the permanent magnet 491 in the longitudinal direction with respect to the intersection G is formed as the S pole, and the other side thereof is formed as the N pole. In FIG. 21, the left side of the permanent magnet 491 in the longitudinal direction is formed as the S pole, and the right side thereof is formed as the N pole.

In the plan view of FIG. 20, the tilt angle θ with respect to the rotation center axis J5 of the segment M is preferably in the range of 30 degrees to 60 degrees, is more preferably in the range of 40 degrees to 50 degrees, and is further more preferably 45 degrees. By arranging the permanent magnet 491 as described above, the movable plate 461b can smoothly rotate around the rotation center axis J5 and the rotation center axis J6. In this embodiment, the segment M is tilted with respect to the rotation center axis J5 and the rotation center axis J6 by about 45 degrees.

In addition, as shown in FIG. 21, in the permanent magnet 491, a concave portion 491a that is open in the upper face is formed. This concave portion 491a is a clearance portion that is used for preventing a contact between the permanent magnet 491 and the movable plate 461b. By forming such a concave portion 491a, a contact between the movable plate 461b and the permanent magnet 491 can be prevented when the movable plate 461b rotates around the rotation center axis J5.

The coil 492 is formed so as to surround the outer periphery of the driving section 461a in the plan view of FIG. 20. Accordingly, a contact between the driving section 461a and the coil 492 can be assuredly prevented when the optical scanner 45 is driven. As a result, a distance between the coil 492 and the permanent magnet 491 can be relatively shortened. Accordingly, the magnetic field generated from the coil 492 can be effectively applied to the permanent magnet 491.

The coil 492 is electrically connected to the voltage applying unit 493. Thus, when a voltage is applied to the coil 492 by the voltage applying unit 493, a magnetic field in the direction of an axis orthogonal to the rotation center axis J3 and the rotation center axis J4 is generated from the coil 492.

As shown in FIG. 22, the voltage applying unit 493 includes a first voltage generating section 493a that generates a first voltage V1 used for rotating the movable plate 461b around the rotation center axis J5, a second voltage generating section 493b that generates a second voltage V2 used for rotating the movable plate 461b around the rotation center axis J6, and a voltage superimposing section 493c that superimposes the first voltage V1 and the second voltage V2 and applies the superimposed voltage to the coil 492.

The first voltage generating section 493a, similarly to that according to the first embodiment shown in FIG. 8, as shown in FIG. 21A, generates the first voltage V1 (vertical scanning voltage) that periodically changes at the period T1 that is acquired by doubling the frame frequency.

The first voltage V1 forms a waveform that is the same as a triangle waveform. Accordingly, the optical scanner 45 can effectively scan (sub-scan) light in a vertically reciprocating manner. However, the waveform of the first voltage V1 is not limited thereto. Here, the frequency (1/T1) of the first voltage V1 is not particularly limited as long as it is a frequency appropriate for vertical scanning. The frequency of the first voltage V1 is preferably in the range of 15 Hz to 40 Hz (about 30 Hz).

In this embodiment, the frequency of the first voltage V1 is adjusted to a frequency that is different from the twisted resonant frequency of the first vibration system 46a that is configured by the driving section 461a and one pair of the first connection portions 462a and 463a.

On the other hand, the second voltage generating section 493b, as shown in FIG. 23B, generates the second voltage V2 (horizontal scanning voltage) that periodically changes at a period T2 different from the period T1.

The second voltage V2 forms a waveform that is the same as a sinusoidal waveform. Accordingly, the optical scanner 45 can effectively perform main scanning of light. However, the waveform of the second voltage V2 is not limited thereto.

The frequency of the second voltage V2 is not particularly limited as long as it is higher than the frequency of the first voltage V1 and is appropriate for horizontal scanning. However, it is preferable that the frequency of the second voltage V2 is in the range of 10 kHz to 40 kHz. By setting the frequency of the second voltage V2 to be in the range of 10 kHz to 40 kHz as described above and setting the frequency of the first voltage V1 to about 30 Hz, the movable plate 461b can rotate around the rotation center axis J5 and the rotation center axis J6 at a frequency that is appropriate for drawing on the screen. However, a combination of the frequency of the first voltage V1 and the frequency of the second voltage V2 is not particularly limited as long as they allow the movable plate 461b to rotate around the rotation center axis J4 and the rotation center axis J6.

In this embodiment, the frequency of the second voltage V2 is adjusted to be the same as the twisted resonant frequency of the second vibration system 46b that is configured by the movable plate 461b and one pair of the second connection portions 462b and 463b. Accordingly, the rotation angle of the movable plate 461b around the rotation center axis J3 can be increased.

In addition, when the resonant frequency of the first vibration system 46a is $f_1$ [Hz] and the resonant frequency of the second vibration system 46b is $f_2$ [Hz], $f_1$ and $f_2$ preferably satisfy the relationship of $f_2 > f_1$, and more preferably satisfy the relationship of $f_2 \geq 10 f_1$. Accordingly, the movable plate 461b can rotate around the rotation center axis J4 more smoothly at the frequency of the second voltage V2 while rotating around the rotation center axis J3 at the frequency of the first voltage V1.

The first voltage generating section 493a and the second voltage generating section 493b are connected to the deformation correcting unit (operation control device) 5 and are driven in accordance with a signal transmitted from the deformation correcting unit (operation control device) 5. To the first voltage generating section 493a and the second voltage generating section 493b described above, the voltage superimposing section 493c is connected.

The voltage superimposing section 493c has an adder 493d that is used for applying a voltage to the coil 492. The adder 493d receives the first voltage V1 from the first voltage generating section 493a and receives the second voltage V2 from the second voltage generating section 493b, superimposing the first voltage V1 and the second voltage V2, and applies the superimposed voltage to the coil 492.

The optical scanner 45 having the above-described configuration is driven as follows.

For example, the first voltage V1 as shown in FIG. 23A and the second voltage V2 as shown in FIG. 23B are superimposed by the voltage superimposing section 493c, and the superimposed voltage is applied to the coil 492 (this superimposed voltage is also referred to as a "voltage V3").

Then, in accordance with a voltage, which is included in the voltage V3, corresponding to the first voltage V1, switching between a magnetic field that attracts the S pole side of the permanent magnet 491 to the coil 492 and repulses the N pole side thereof from the coil 492 and a magnetic field that repulses the S pole side of the permanent magnet 491 from the coil 492 and attracts the N pole side thereof to the coil 492 is performed in an alternating manner. Accordingly, the driving section 461a rotates around the rotation center axis J5 at the frequency of the first voltage V1 together with the movable plate 461b while deforming the first connection portions 462a and 463a by twisting.

In addition, the frequency of the first voltage V1 is set to be much lower than that of the second voltage V2, and the resonant frequency of the first vibration system 46a is designed to be lower than that of the second vibration system 46b. Accordingly, the first vibration system 46a can vibrate more easily than the second vibration system 46b, and the movable plate 461b is prevented from rotating around the rotation center axis J6 in accordance with the first voltage V1.

On the other hand, in accordance with a voltage, which is included in the voltage V3, corresponding to the second voltage V2, switching between a magnetic field that attracts the S pole side of the permanent magnet 491 to the coil 492 and repulses the N pole side thereof from the coil 492 and a magnetic field that repulses the S pole side of the permanent magnet 491 from the coil 492 and attracts the N pole side thereof to the coil 492 is performed in an alternating manner. Accordingly, the movable plate 461b rotates around the rotation center axis J6 at the frequency of the second voltage V2 while deforming the second connection portions 462b and 463b by twisting.

In addition, since the frequency of the second voltage V2 is the same as the twisted resonant frequency of the second vibration system 46b, the movable plate 461b can rotate around the rotation center axis J6 dominantly in accordance with the second voltage V2. Accordingly, the movable plate 461b is prevented from rotating around the rotation center axis J5 together with the driving section 461a in accordance with the second voltage V2.

According to the above-described optical scanner 45, the laser beam (light) can be scanned in two dimensions by using one actuator, and the space of the light scanning unit 4 can be saved. In addition, for example, in a case where one pair of the optical scanners is used as in the first embodiment, the relative positional relationship between the optical scanners must be set with high precision. However, in this embodiment, such a setting process is not necessary, and accordingly, a manufacturing process can be performed in an easy manner.

In addition, in this embodiment, differently from FIGS. 6A and 6B of the first embodiment, when the laser beam LL1 is scanned in two dimensions on the drawing area S11 in the light emitting state in which the laser beam (light) LL1 is emitted from the light source unit 3 as shown in FIGS. 24A and 24B, a plurality of drawing lines L that form the locus of the laser beam LL1 on the drawing area S11 are disposed in a zigzag pattern and in a distorted manner.

In addition, since the drawing lines L are distorted, the video data calculating section 52 preforms various correction calculation processes and the like based on the drawing timing information that is read out from the video data memory section 51 and is input from the drawing timing generating section 53 while calculating data corresponding to pixel data to be drawn on the line to be scanned thereafter and then transmits the luminance data of each color to the light source modulating section 54.

The processes other than the above-described process are the same as those of the first embodiment.

The light scanning unit included in the vector scanning module also has an optical scanner having the same configuration as that of the optical scanner 45. However, in the optical scanner included in the vector scanning module, the first vibration system and the second vibration system are driven in a non-resonant manner.

According to the third embodiment, the same advantages as those of the first embodiment can be demonstrated.

As presented above, the optical scanning projector according to the embodiments of the invention has been described with reference to the accompanying drawings. However, the invention is not limited thereto. Thus, the configuration of each unit, section, or portion can be replaced with an arbitrary configuration having the same function. In addition, another arbitrary constituent element may be added to an embodiment of the invention. Furthermore, arbitrary two or more configurations (aspects) of the above-described embodiments may be combined.

In the above-described embodiments, a form in which an image is drawn in a drawing area that is formed on the display surface of a screen has been described. However, the invention is not limited thereto. Thus, an image may be directly drawn, for example, on a wall surface, a floor surface, or the like.

In addition, in the above-described first embodiment, as a light scanning unit that has both the raster scanning module and the vector scanning module, one pair of the optical scanners are used. However, the invention is not limited thereto. For example, an optical scanner and a galvano mirror may be used. In such a case, it is preferable that the galvano mirror is used for vertical scanning.

In addition, in the above-described embodiments, one laser beam (light) is emitted by combining a red laser beam, a green laser beam, and a blue laser beam by using three dichroic mirrors. However, the laser beams may be combined by using a dichroic prism or the like.

In addition, in the above-described embodiments, the light source unit has been described to have a configuration including a laser light source emitting a red laser beam, a laser light source emitting a blue laser beam, and a laser light source emitting a green laser beam. However, the invention is not limited thereto. Thus, for example, the light source unit may include a laser light source emitting red laser, a laser light source emitting blue laser, and a laser light source emitting ultraviolet laser. In such a case, a fluorescent body that generates green fluorescence by irradiating ultraviolet laser thereon is included on the screen. Accordingly, a full-color image can be displayed in the drawing area.

The entire disclosure of Japanese Patent Application No.: 2009-259692, filed Nov. 13, 2009 and 2010-096318, filed Apr. 19, 2010 are expressly incorporated by reference herein.

What is claimed is:

1. An optical scanning projector comprising:
    a raster scanning unit that draws a first image in a drawing area on a display surface by scanning beams in a first direction on the display surface while scanning beams in a second direction on the display surface that is orthogonal to the first direction;
    a vector scanning unit that draws a second image by irradiating beams so as to sequentially form segments each connecting two different points positioned on the display surface, the vector scanning unit operable to draw the second image so as to display a contour of the first image drawn by the raster scanning unit; and
    a contour detecting unit that detects the contour,
    wherein the vector scanning unit displays the contour based on a detection result of the contour detecting unit.

2. The optical scanning projector according to claim 1, wherein the first image drawn by the raster scanning unit and the second image drawn by the vector scanning unit at least partially overlap with each other.

3. The optical scanning projector according to claim 1, wherein the vector scanning unit draws the second image so as to display a contour of the drawing area.

4. The optical scanning projector according to claim 3, wherein coordinate data of the contour is included in image data of the first image that is drawn by the raster scanning unit, and
wherein the vector scanning unit displays the contour based on the coordinate data of the contour.

5. The optical scanning projector according to claim 1, wherein the contour detecting unit detects the contour based on at least one parameter from among hue, chroma, and lightness of adjacent pixels in the first image drawn by the raster scanning unit.

6. The optical scanning projector according to claim 5, wherein the contour detecting unit detects a boundary of the adjacent pixels as the contour in a case where the hues of the adjacent pixels are separated from each other by a predetermined gap or more on a chromaticity diagram of an XYZ color coordinate system.

7. The optical scanning projector according to claim 1, wherein the first image that the vector scanning unit draws an image that includes at least one of a text, a number, and a symbol.

8. The optical scanning projector according to claim 1, wherein luminance per unit area of the vector scanning unit within the drawing area is higher than luminance per unit area of the raster scanning unit within the drawing area.

9. The optical scanning projector according to claim 1, wherein each of the raster scanning unit and the vector scanning unit has a light emitting section that emits a laser beam and an optical scanner, in which a movable plate having a light reflecting portion reflecting the laser emitted from the light emitting section is arranged so as to be rotatable in at least one direction or two directions orthogonal to each other, having an optical scanner that scans the laser reflected from the light reflecting portion in accordance with the rotation to the drawing area.

10. The optical scanning projector according to claim 1, wherein the raster scanning unit includes a deformation correcting section that corrects deformation of an image displayed in the drawing area.

11. The optical scanning projector according to claim 1, further comprising a casing,
wherein the raster scanning unit and the vector scanning unit are arranged within the casing.

12. An optical scanning projector comprising:
a raster scanning unit that draws a first image in a drawing area by performing sub-scanning in a direction different from that of primary scanning while primarily scanning beams on the drawing area that is formed on a display surface;
a vector scanning unit that draws a second image by irradiating beams so as to sequentially form segments each connecting two different points positioned on the display surface, the vector scanning unit operable to draw the second image so as to display a contour of the first image drawn by the raster scanning unit; and
a contour detecting unit that detects the contour,
wherein the vector scanning unit displays the contour based on a detection result of the contour detecting unit.

* * * * *

UNITED STATES PATENT AND TRADEMARK OFFICE
CERTIFICATE OF CORRECTION

PATENT NO. : 8,459,799 B2
APPLICATION NO. : 12/906191
DATED : June 11, 2013
INVENTOR(S) : Shuichi Wakabayashi et al.

It is certified that error appears in the above-identified patent and that said Letters Patent is hereby corrected as shown below:

Title Page,

Item (75), Inventors, Line 1, "Shuich" should be --Shuichi--.

Signed and Sealed this
Seventeenth Day of September, 2013

Teresa Stanek Rea
*Deputy Director of the United States Patent and Trademark Office*